United States Patent
Zhang et al.

(10) Patent No.: US 11,051,171 B2
(45) Date of Patent: Jun. 29, 2021

(54) COMMUNICATION METHOD, RELATED DEVICE, AND SYSTEM

(71) Applicant: HUAWEI TECHNOLOGIES CO., LTD., Guangdong (CN)

(72) Inventors: Bo Zhang, Shenzhen (CN); Rong Wu, Shenzhen (CN); Lu Gan, Shenzhen (CN); Lichun Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/569,415

(22) Filed: Sep. 12, 2019

(65) Prior Publication Data

US 2020/0008041 A1 Jan. 2, 2020

Related U.S. Application Data

(63) Continuation of application No. PCT/CN2018/077920, filed on Mar. 2, 2018.

(30) Foreign Application Priority Data

Mar. 31, 2017 (CN) .......................... 20171020884.3

(51) Int. Cl.
*H04W 12/08* (2021.01)
*H04W 8/02* (2009.01)
(Continued)

(52) U.S. Cl.
CPC .............. *H04W 12/08* (2013.01); *H04W 8/02* (2013.01); *H04W 8/26* (2013.01); *H04W 36/08* (2013.01); *H04W 12/04* (2013.01)

(58) Field of Classification Search
CPC ......... H04W 8/02; H04W 12/10; H04W 8/26; H04W 36/08
See application file for complete search history.

(56) References Cited

U.S. PATENT DOCUMENTS

2008/0176572 A1 7/2008 Forsberg
2009/0122762 A1 5/2009 Kitazoe et al.
(Continued)

FOREIGN PATENT DOCUMENTS

CN 101836470 A 9/2010
CN 101843139 A 9/2010
(Continued)

OTHER PUBLICATIONS

Panasonic:"PDCP SN indication from source eNB during inter-eNB HO",3GPP Draft; R3-071456, Aug. 15, 2007, total 6 pages.
(Continued)

*Primary Examiner* — Chi Ho A Lee
(74) *Attorney, Agent, or Firm* — Womble Bond Dickinson (US) LLP

(57) ABSTRACT

Embodiments of the present invention disclose a communication method, a related device, and a system. The system may include a terminal, a first access network node (AN), and a second AN. The first AN is configured to determine that the terminal meets a condition of being handed over from the first AN to the second AN, where a value of a target parameter used for encryption and/or integrity protection when the terminal and the first AN communicate with each other before the terminal is handed over to the second AN is equal to a first reference value. In the system, the first AN may further be configured to send a target message to the second AN to instruct the second AN to obtain a second reference value. The second AN may be configured to obtain the second reference value based on the target message. Furthermore, the terminal may be configured to obtain the second reference value, where the second reference value is used as a value of the target parameter used for encryption and/or integrity protection when the second AN and the terminal communicate with each other. According to the (Continued)

embodiments of the present invention, security performance of the terminal can be improved.

19 Claims, 15 Drawing Sheets

(51) Int. Cl.
*H04W 8/26* (2009.01)
*H04W 36/08* (2009.01)
*H04W 12/04* (2021.01)

(56) References Cited

U.S. PATENT DOCUMENTS

| | | | |
|---|---|---|---|
| 2011/0092213 A1* | 4/2011 | Forsberg | H04W 36/30 |
| | | | 455/436 |
| 2011/0122843 A1 | 5/2011 | Iwamura et al. | |
| 2012/0224525 A1* | 9/2012 | Wang | H04W 84/12 |
| | | | 370/315 |
| 2012/0230298 A1* | 9/2012 | Kitazoe | H04W 12/001 |
| | | | 370/331 |
| 2012/0288095 A1 | 11/2012 | McCann | |
| 2012/0300614 A1* | 11/2012 | Ha | H04L 1/0072 |
| | | | 370/216 |
| 2014/0051442 A1* | 2/2014 | Yang | H04W 36/0061 |
| | | | 455/436 |
| 2015/0223058 A1 | 8/2015 | Yang et al. | |
| 2016/0095025 A1* | 3/2016 | Wegmann | H04W 24/02 |
| | | | 455/436 |
| 2016/0165438 A1* | 6/2016 | Xu | H04W 12/04031 |
| | | | 380/278 |
| 2016/0174124 A1* | 6/2016 | Basu Mallick | H04W 74/006 |
| | | | 370/331 |
| 2019/0335367 A1* | 10/2019 | Yue | H04W 36/00 |

FOREIGN PATENT DOCUMENTS

| | | |
|---|---|---|
| CN | 102027770 A | 4/2011 |
| CN | 102316455 A | 1/2012 |
| CN | 102440019 A | 5/2012 |
| CN | 103686708 A | 3/2014 |
| CN | 103931219 A | 7/2014 |
| CN | 104185177 A | 12/2014 |
| CN | 104683981 A | 6/2015 |
| EP | 1276279 A1 | 1/2003 |
| EP | 1969887 A2 | 9/2008 |
| EP | 2271144 A1 | 1/2011 |
| WO | 2009018318 A2 | 2/2009 |
| WO | 2009055414 A2 | 4/2009 |
| WO | 2009058903 A1 | 5/2009 |
| WO | 2016077087 A1 | 5/2016 |

OTHER PUBLICATIONS

Ericsson, New KI Supporting integrity protection of UP. 3GPP TSG-SS WG3 Meeting #86, Sophia Antipolis, France, Feb. 6-10, 2017, S3-170231, 2 pages.

Chen Fatang et al., Security design and its realization of access stratum for TD-LTE. Application of Electronic Technique, vol. 38, No. 4, 20212, 4 pages.

* cited by examiner

COMMUNICATION METHOD, RELATED DEVICE, AND SYSTEM

CROSS-REFERENCE TO RELATED APPLICATIONS

This application is a continuation of International Application No. PCT/CN2018/077920, filed on Mar. 2, 2018, which claims priority to Chinese Patent Application No. 201710208884.3, filed on Mar. 31, 2017. The disclosures of the aforementioned applications are hereby incorporated by reference in their entireties.

TECHNICAL FIELD

The present disclosure relates to the field of communications technologies, and in particular, to a communication method, a related device, and a system.

BACKGROUND

In an existing long term evolution (LTE) security architecture, user equipment (UE) accesses an operator network by using a base station. Control plane data and user plane data are transmitted between the UE and the base station. Protocol stack formats used when the two types of data are transmitted each include a packet data convergence protocol (PDCP) layer. Information at the PDCP layer may be used for encryption/decryption and integrity protection of data. There are a plurality of PDCP formats, and each format includes a PDCP SN field that is briefly referred to as a sequence number (SN) below. FIG. 1A shows a PDCP format. The PDCP format includes a PDCP SN field and a data field. The data field is used to encapsulate user data. The PDCP SN field is used to encapsulate a parameter SN that is at the PDCP layer and that is used for encryption/decryption and/or integrity protection.

FIG. 1B is a schematic diagram of an encryption/decryption scenario. In FIG. 1B, the left side of a dashed line indicates an encryption procedure, and the right side of the dashed line indicates a decryption procedure. An algorithm used in each of the encryption procedure and the decryption procedure may be represented by using f8. Input of f8 includes: a cipher key (CK), a counter (also referred to as Count-C), a bearer identifier (Bearer), a direction, and a length (e.g., a length identifier). Integrity protection of data is similar to encryption/decryption, and the counter parameter needs to be used for both integrity protection and encryption/decryption. The counter generally includes a hyper frame number (HFN) and a SN. A keystream block, a plaintext block, and a ciphertext block may be further used in a key generation process. Encryption is usually performed by a sender, and decryption is usually performed by a receiver. For example, when the UE is a sender, a radio network controller (RNC) is a receiver; or when an RNC is a receiver, the UE is a sender. The SN in the PDCP SN field needs to be sent by using plaintext, so that the receiver can complete decryption or integrity verification based on the SN. However, the SN sent by using the plaintext is easily intercepted by an attacker. When UE is handed over from one base station to another base station, if the attacker intercepts, near the two base stations, a plaintext SN sent by the UE, a moving status of the UE can be determined, and this is unfavorable for security of the UE.

SUMMARY

To resolve a technical problem, embodiments of the present invention provide a communication method, a related device, and a system, to improve security performance of UE.

According to a first aspect, an embodiment of the present invention provides a communications system, where the system includes a terminal, a first access network node (AN), and a second access network node AN, where the first AN is configured to determine that the terminal meets a condition of being handed over from the first AN to the second AN, where a value of a target parameter used for encryption and/or integrity protection when the terminal and the first AN communicate with each other before the terminal is handed over to the second AN is equal to a first reference value, and the target parameter is a counter or a sequence number (SN); the first AN is configured to send a target message to the second AN, to instruct the second AN to obtain a second reference value; the second AN is configured to obtain the second reference value based on the target message; and the terminal is configured to obtain the second reference value, where the second reference value is used as a value of the target parameter used for encryption and/or integrity protection when the second AN and the terminal communicate with each other.

The system is run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the first aspect, in a first possible embodiment of the first aspect, the system includes mobility management (MM); the first AN is configured to send a target request to the MM, to request the MM to generate the second reference value, and receive the second reference value sent by the MM, where the target message includes the second reference value; and the MM is configured to receive the target request, generate the second reference value based on the target request, and send the generated second reference value to the first AN.

With reference to the first aspect or any one of the foregoing possible embodiment of the first aspect, in a second possible embodiment of the first aspect, the first AN is configured to randomly generate the second reference value by using a randomized algorithm, or derive the second reference value according to a preset rule, where the target message includes the second reference value; and that the second AN is configured to obtain the second reference value based on the target message includes: the second AN is configured to parse out the second reference value from the target message.

With reference to the first aspect or either of the foregoing possible embodiments of the first aspect, in a third possible embodiment of the first aspect, the first AN is configured to send the second reference value to the terminal; and that the terminal is configured to obtain the second reference value includes: the terminal is configured to receive the second reference value sent by the first AN.

With reference to the first aspect or any one of the foregoing possible embodiments of the first aspect, in a fourth possible embodiment of the first aspect, that the second AN is configured to obtain the second reference value based on the target message includes: the second AN is configured to randomly generate the second reference value based on the target message by using a randomized algorithm, or derive the second reference value based on the target message according to a preset rule.

With reference to the first aspect or any one of the foregoing possible embodiments of the first aspect, in a fifth possible embodiment of the first aspect, the system includes mobility management (MM); that the second AN is configured to obtain the second reference value based on the target message includes: the second AN is configured to send a target request to the MM based on the target message, to request the MM to generate the second reference value, and receive the second reference value sent by the MM; and the MM is configured to receive the target request, generate the second reference value based on the target request, and send the generated second reference value to the second AN.

With reference to the first aspect or any one of the foregoing possible embodiments of the first aspect, in a sixth possible embodiment of the first aspect, the second AN is configured to send the second reference value to the first AN; and the first AN is configured to send the second reference value to the terminal.

With reference to the first aspect or any one of the foregoing possible embodiments of the first aspect, in a seventh possible embodiment of the first aspect, the second AN is configured to send the second reference value to the terminal.

With reference to the first aspect or any one of the foregoing possible embodiments of the first aspect, in an eighth possible embodiment of the first aspect, the first AN is configured to send a parameter generation request to the terminal; and that the terminal is configured to obtain the second reference value includes: the terminal is configured to randomly generate the second reference value based on the parameter generation request by using the randomized algorithm, or derive the second reference value based on the parameter generation request according to the preset rule.

According to a second aspect, an embodiment of the present invention provides an access network node (AN), where the AN is a first AN, the first AN includes a processor, a memory, and a transceiver, the memory is configured to store a program, and the processor invokes the program in the memory to perform the following operations: determining that a terminal accessing the first AN meets a condition of being handed over from the first AN to a second AN, where a value of a target parameter used for encryption and/or integrity protection when the terminal and the first AN communicate with each other before the terminal is handed over to the second AN is equal to a first reference value, and the target parameter is a counter or a sequence number SN; and sending a target message to the second AN by using the transceiver, to instruct the second AN to obtain a second reference value, where the second reference value is used as a value of the target parameter used for encryption and/or integrity protection when the second AN and the terminal communicate with each other.

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the second aspect, in a first possible embodiment of the second aspect, before the processor sends the target message to the second AN by using the transceiver, to instruct the second AN to obtain the second reference value, the processor is further configured to send a target request to an MM by using the transceiver, to request the MM to generate the second reference value, and receive, by using the transceiver, the second reference value that is generated by the MM based on the target request and that is sent by the MM, where the target message includes the second reference value.

With reference to the second aspect or any one of the foregoing possible embodiment of the second aspect, in a second possible embodiment of the second aspect, before the processor sends the target message to the second AN by using the transceiver, to instruct the second AN to obtain the second reference value, the processor is further configured to randomly generate the second reference value by using a randomized algorithm, or derive the second reference value according to a preset rule, where the target message includes the second reference value.

With reference to the second aspect or either of the foregoing possible embodiments of the second aspect, in a third possible embodiment of the second aspect, the processor is further configured to send the second reference value to the terminal by using the transceiver.

With reference to the second aspect or either of the foregoing possible embodiments of the second aspect, in a fourth possible embodiment of the second aspect, the processor is further configured to send a parameter generation request to the terminal by using the transceiver, so that the terminal randomly generates the second reference value based on the parameter generation request by using the randomized algorithm, or derives the second reference value based on the parameter generation request according to the preset rule.

According to a third aspect, an embodiment of the present invention provides an access network node (AN), where the AN is a second AN, the second AN includes a processor, a memory, and a transceiver, the memory is configured to store a program, and the processor invokes the program in the memory to perform the following operations: receiving, by using the transceiver, a target message sent by a first AN, where the target message is a message sent by the first AN when the first AN determines that the terminal meets a condition of being handed over from the first AN to the second AN, a value of a target parameter used for encryption and/or integrity protection when the terminal and the first AN communicate with each other before the terminal is handed over to the second AN is equal to a first reference value, and the target parameter is a counter or a sequence number SN; and obtaining a second reference value based on the target message, where the second reference value is used as a value of the target parameter used for encryption and/or integrity protection when the second AN and the terminal communicate with each other.

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the third aspect, in a first possible embodiment of the third aspect, the target message includes the second reference value, and that the processor obtains a second reference value based on the target message is specifically: parsing out the second reference value from the target message.

With reference to the third aspect or any one of the foregoing possible embodiment of the third aspect, in a second possible embodiment of the third aspect, that the processor obtains a second reference value based on the target message is specifically: randomly generating the second reference value based on the target message by using a randomized algorithm, or deriving the second reference value based on the target message according to a preset rule.

With reference to the third aspect or either of the foregoing possible embodiments of the third aspect, in a third possible embodiment of the third aspect, that the processor obtains a second reference value based on the target message is specifically: sending a target request to an MM based on the target message by using the transceiver, to request the MM to generate the second reference value; and receiving, by using the transceiver, the second reference value sent by the MM.

With reference to the third aspect or any one of the foregoing possible embodiments of the third aspect, in a fourth possible embodiment of the third aspect, after the processor is configured to obtain the second reference value based on the target message, the processor is further configured to send the second reference value to the first AN by using the transceiver, so that the first AN sends the second reference value to the terminal.

With reference to the third aspect or any one of the foregoing possible embodiments of the third aspect, in a fifth possible embodiment of the third aspect, after the processor is configured to obtain the second reference value based on the target message, the processor is further configured to send the second reference value to the terminal by using the transceiver.

According to a fourth aspect, an embodiment of the present invention provides a terminal, where the terminal includes a processor, a memory, and a transceiver, the memory is configured to store a program, and the processor invokes the program in the memory to perform the following operations: if the terminal meets a condition of being handed over from a first AN to a second AN, generating a second reference value, or receiving, by using the transceiver, the second reference value sent by the first AN, or receiving, by using the transceiver, the second reference value sent by the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the fourth aspect, in a first possible embodiment of the fourth aspect, that the processor generates a second reference value is specifically: receiving, by using the transceiver, a parameter generation request sent by the first AN when the first AN determines that the terminal meets the condition of being handed over from the first AN to the second AN; and randomly generating the second reference value based on the parameter generation request by using a randomized algorithm, or deriving the second reference value based on the parameter generation request according to the preset rule.

According to a fifth aspect, an embodiment of the present invention provides an access network node (AN), where the AN may be referred to as a first AN, and the first AN includes a determining unit and a first sending unit, where the determining unit is configured to determine that a terminal accessing the first AN meets a condition of being handed over from the first AN to a second AN, where a value of a target parameter used for encryption and/or integrity protection when the terminal and the first AN communicate with each other before the terminal is handed over to the second AN is equal to a first reference value, and the target parameter is a counter or a sequence number (SN); and the first sending unit is configured to send a target message to the second AN, to instruct the second AN to obtain a second reference value, where the second reference value is used as a value of the target parameter used for encryption and/or integrity protection when the second AN and the terminal communicate with each other.

The foregoing units are run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the fifth aspect, in a first possible embodiment of the fifth aspect, the first AN further includes a second processing unit, where the second processing unit is configured to, before the first sending unit sends the target message to the second AN to instruct the second AN to obtain the second reference value, send a target request to an MM to request the MM to generate the second reference value, and receive the second reference value that is generated by the MM based on the target request and that is sent by the MM, where the target message includes the second reference value.

With reference to the fifth aspect or any one of the foregoing possible embodiment of the fifth aspect, in a second possible embodiment of the fifth aspect, the first AN further includes a calculation unit, where the calculation unit is configured to, before the first sending unit sends the target message to the second AN to instruct the second AN to obtain the second reference value, randomly generate the second reference value by using a randomized algorithm, or derive the second reference value according to a preset rule, where the target message includes the second reference value.

With reference to the fifth aspect or either of the foregoing possible embodiments of the fifth aspect, in a third possible embodiment of the fifth aspect, the first AN further includes a second sending unit, where the second sending unit is configured to send the second reference value to the terminal.

With reference to the fifth aspect or either of the foregoing possible embodiments of the fifth aspect, in a fourth possible embodiment of the fifth aspect, the first AN further includes a third sending unit, where the third sending unit is configured to send a parameter generation request to the terminal, so that the terminal randomly generates the second reference value based on the parameter generation request by using the randomized algorithm, or derives the second reference value based on the parameter generation request according to the preset rule.

According to a sixth aspect, an embodiment of the present invention provides an AN, where the AN is a second AN, and the second AN includes a first receiving unit and an obtaining unit, where the first receiving unit is configured to receive a target message sent by a first AN, where the target message is a message sent by the first AN when the first AN determines that the terminal meets a condition of being handed over from the first AN to the second AN, a value of a target parameter used for encryption and/or integrity protection when the terminal and the first AN communicate with each other before the terminal is handed over to the second AN is equal to a first reference value, and the target parameter is a counter or a sequence number (SN); and the obtaining unit is configured to obtain a second reference value based on the target message, where the second reference value is used as a value of the target parameter used for encryption and/or integrity protection when the second AN and the terminal communicate with each other.

The foregoing units are run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the sixth aspect, in a first possible embodiment of the sixth aspect, the target message includes the second reference value, and that the obtaining unit obtains a second reference value based on the target message is specifically: parsing out the second reference value from the target message.

With reference to the sixth aspect or any one of the foregoing possible embodiment of the sixth aspect, in a second possible embodiment of the sixth aspect, that the obtaining unit obtains a second reference value based on the target message is specifically: randomly generating the second reference value based on the target message by using a randomized algorithm, or deriving the second reference value based on the target message according to a preset rule.

With reference to the sixth aspect or either of the foregoing possible embodiments of the sixth aspect, in a third possible embodiment of the sixth aspect, that the obtaining unit obtains a second reference value based on the target message is specifically: sending a target request to an MM based on the target message, to request the MM to generate the second reference value; and receiving the second reference value sent by the MM.

With reference to the sixth aspect or any one of the foregoing possible embodiments of the sixth aspect, in a fourth possible embodiment of the sixth aspect, the second AN further includes a fourth sending unit, where the fourth sending unit is configured to, after the obtaining unit obtains the second reference value based on the target message, send the second reference value to the first AN, so that the first AN sends the second reference value to the terminal.

With reference to the sixth aspect or any one of the foregoing possible embodiments of the sixth aspect, in a fifth possible embodiment of the sixth aspect, the second AN further includes a fifth sending unit, where the fifth sending unit is configured to, after the second AN obtains the second reference value based on the target message, send the second reference value to the terminal.

According to a seventh aspect, an embodiment of the present invention provides a terminal, where the terminal includes a processing unit, where the processing unit is configured to, when the terminal meets a condition of being handed over from a first AN to a second AN, generate a second reference value, or receive the second reference value sent by the first AN, or receive the second reference value sent by the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number SN.

The foregoing unit is run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the seventh aspect, in a first possible embodiment of the seventh aspect, that the terminal generates a second reference value is specifically: receiving a parameter generation request sent by the first AN when the first AN determines that the terminal meets the condition of being handed over from the first AN to the second AN; and randomly generating the second reference value based on the parameter generation request by using a randomized algorithm, or deriving the second reference value based on the parameter generation request according to the preset rule.

According to an eighth aspect, an embodiment of the present invention provides a communication method, where the communication method includes: determining, by a first AN, that a terminal accessing the first AN meets a condition of being handed over from the first AN to a second AN, where a value of a target parameter used for encryption and/or integrity protection when the terminal and the first AN communicate with each other before the terminal is handed over to the second AN is equal to a first reference value, and the target parameter is a counter or a sequence number (SN); and sending, by the first AN, a target message to the second AN, to instruct the second AN to obtain a second reference value, where the second reference value is used as a value of the target parameter used for encryption and/or integrity protection when the second AN and the terminal communicate with each other.

The foregoing steps are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the eighth aspect, in a first possible embodiment of the eighth aspect, before the sending, by the first AN, a target message to the second AN, to instruct the second AN to obtain a second reference value, the method further includes: sending, by the first AN, a target request to the MM, to request the MM to generate the second reference value, and receiving the second reference value that is generated by the MM based on the target request and that is sent by the MM, where the target message includes the second reference value.

With reference to the eighth aspect or any one of the foregoing possible embodiment of the eighth aspect, in a second possible embodiment of the eighth aspect, before the sending, by the first AN, a target message to the second AN, to instruct the second AN to obtain a second reference value, the method further includes: randomly generating, by the first AN, the second reference value by using a randomized algorithm, or deriving the second reference value according to a preset rule, where the target message includes the second reference value.

With reference to the eighth aspect or either of the foregoing possible embodiments of the eighth aspect, in a third possible embodiment of the eighth aspect, the method further includes: sending, by the first AN, the second reference value to the terminal.

With reference to the eighth aspect or either of the foregoing possible embodiments of the eighth aspect, in a fourth possible embodiment of the eighth aspect, the method further includes: sending, by the first AN, a parameter generation request to the terminal, so that the terminal randomly generates the second reference value based on the parameter generation request by using the randomized algorithm, or derives the second reference value based on the parameter generation request according to the preset rule.

According to a ninth aspect, an embodiment of the present invention provides a communication method, where the communication method includes: receiving, by a second AN, a target message sent by a first AN, where the target message is a message sent by the first AN when the first AN determines that the terminal meets a condition of being handed over from the first AN to the second AN, a value of a target parameter used for encryption and/or integrity protection when the terminal and the first AN communicate with each other before the terminal is handed over to the second AN is equal to a first reference value, and the target parameter is a counter or a sequence number (SN); and obtaining, by the second AN, a second reference value based on the target message, where the second reference value is used as a value of the target parameter used for encryption and/or integrity protection when the second AN and the terminal communicate with each other.

The foregoing steps are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the ninth aspect, in a first possible embodiment of the ninth aspect, the target message includes the second reference value, and the obtaining, by the second AN, a second reference value based on the target message includes: parsing out the second reference value from the target message.

With reference to the ninth aspect or any one of the foregoing possible embodiment of the ninth aspect, in a second possible embodiment of the ninth aspect, the obtaining, by the second AN, a second reference value based on the target message includes: randomly generating the second reference value based on the target message by using a randomized algorithm, or deriving the second reference value based on the target message according to a preset rule.

With reference to the ninth aspect or either of the foregoing possible embodiments of the ninth aspect, in a third possible embodiment of the ninth aspect, the obtaining, by the second AN, a second reference value based on the target message includes: sending a target request to an MM based on the target message, to request the MM to generate the second reference value; and receiving the second reference value sent by the MM.

With reference to the ninth aspect or any one of the foregoing possible embodiments of the ninth aspect, in a fourth possible embodiment of the ninth aspect, after the obtaining, by the second AN, a second reference value based on the target message, the method further includes: sending, by the second AN, the second reference value to the first AN, so that the first AN sends the second reference value to the terminal.

With reference to the ninth aspect or any one of the foregoing possible embodiments of the ninth aspect, in a fifth possible embodiment of the ninth aspect, after the obtaining, by the second AN, a second reference value based on the target message, the method further includes: sending, by the second AN, the second reference value to the terminal.

According to a tenth aspect, an embodiment of the present invention provides a communication method, where the method includes: if a terminal meets a condition of being handed over from a first AN to a second AN, generating, by the terminal, a second reference value, or receiving the second reference value sent by the first AN, or receiving the second reference value sent by the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing steps are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the tenth aspect, in a first possible embodiment of the tenth aspect, the generating, by the terminal, a second reference value includes: receiving a parameter generation request sent by the first AN when the first AN determines that the terminal meets the condition of being handed over from the first AN to the second AN; and randomly generating the second reference value based on the parameter generation request by using a randomized algorithm, or deriving the second reference value based on the parameter generation request according to the preset rule.

According to an eleventh aspect, an embodiment of the present invention provides a communication method, where the method includes: receiving, by a mobility management node (MM), a target message, where the target message is sent by a first access network node (AN) or a second access network node (AN) to the MM when a terminal meets a condition of being handed over from the first AN to the second AN; generating, by the MM, a second reference value based on the target message; and sending, by the MM, the second reference value to the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing steps are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the eleventh aspect, in a first possible embodiment of the eleventh aspect, the sending, by the MM, the second reference value to the second AN includes: sending, by the MM, the second reference value to the first AN, so that the first AN sends the second reference value to the second AN.

According to a twelfth aspect, an embodiment of the present invention provides a mobility management node (MM), where the MM includes a processor, a memory, and a transceiver, the memory is configured to store a program, and the processor invokes the program in the memory to perform the following operations: receiving a target message by using the transceiver, where the target message is sent by a first access network node (AN) or a second access network node (AN) to the MM when a terminal meets a condition of being handed over from the first AN to the second AN; generating a second reference value based on the target message; and sending the second reference value to the second AN by using the transceiver, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the twelfth aspect, in a first possible embodiment of the twelfth aspect, that the processor sends the second reference value to the second AN by using the transceiver is specifically: sending the second reference value to the first AN by using the transceiver, so that the first AN sends the second reference value to the second AN.

According to a thirteenth aspect, an embodiment of the present invention provides a mobility management node (MM), where the MM includes a receiving unit, a generation unit, and a sending unit, where the receiving unit is configured to receive a target message, where the target message is sent by a first access network node (AN) or a second access network node AN to the MM when a terminal meets a condition of being handed over from the first AN to the second AN; the generation unit is configured to generate a second reference value based on the target message; and the sending unit is configured to send the second reference value to the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing steps are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

With reference to the thirteenth aspect, in a first possible embodiment of the thirteenth aspect, that the sending unit sends the second reference value to the second AN is specifically: sending the second reference value to the first AN, so that the first AN sends the second reference value to the second AN.

According to a fourteenth aspect, an embodiment of the present invention further provides a computer storage medium. The storage medium may be non-volatile, that is, content is not lost after powering-off. The storage medium stores a software program, and when the software program is read and executed by one or more processors, the method provided in the eighth aspect or any possible embodiment of the eighth aspect may be implemented.

According to a fifteenth aspect, an embodiment of the present invention further provides another computer storage medium. The storage medium may be non-volatile, that is, content is not lost after powering-off. The storage medium stores a software program, and when the software program is read and executed by one or more processors, the method provided in the ninth aspect or any possible embodiment of the ninth aspect may be implemented.

According to a sixteenth aspect, an embodiment of the present invention further provides another computer storage medium. The storage medium may be non-volatile, that is, content is not lost after powering-off. The storage medium stores a software program, and when the software program is read and executed by one or more processors, the method provided in the tenth aspect or any possible embodiment of the tenth aspect may be implemented.

According to a seventeenth aspect, an embodiment of the present invention further provides another computer storage medium. The storage medium may be non-volatile, that is, content is not lost after powering-off. The storage medium stores a software program, and when the software program is read and executed by one or more processors, the method provided in the eleventh aspect or any possible embodiment of the eleventh aspect may be implemented.

The embodiments of the present invention are implemented, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 1A:
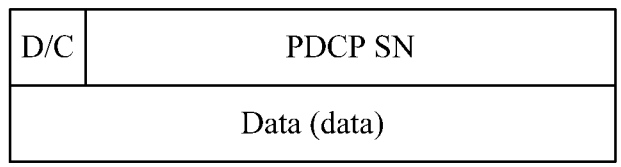
FIG. 1A is a schematic structural diagram of a PDCP format in the prior art.
Figure 1B:
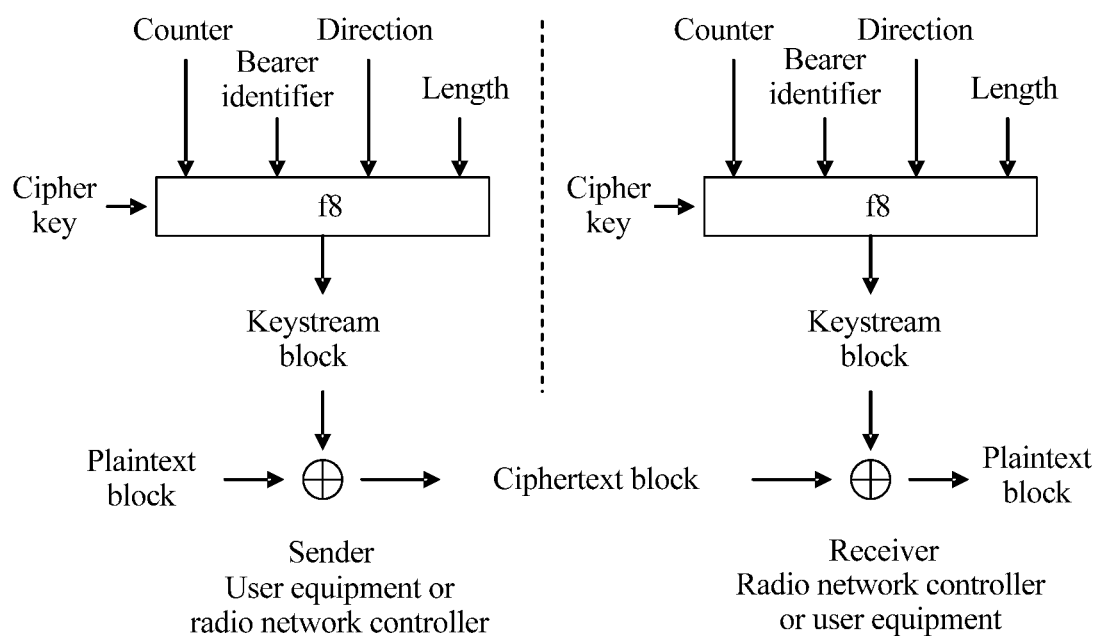
FIG. 1B is a schematic diagram of an encryption/decryption scenario in the prior art.
Figure 2:
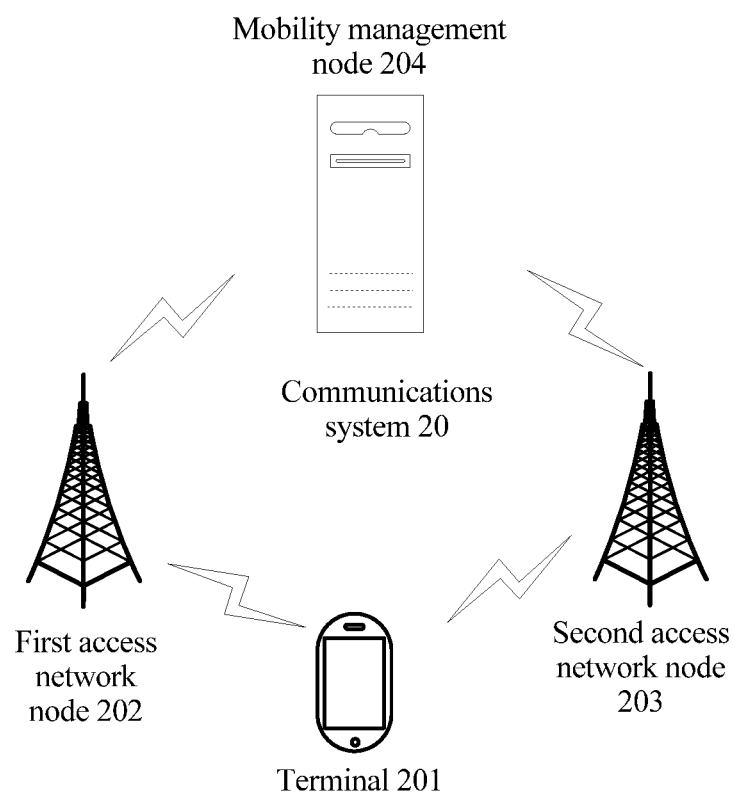
FIG. 2 is a schematic structural diagram of a communications system according to an embodiment of the present invention.

FIG. 2 is a schematic architectural diagram of a communications system 20 according to an embodiment of the present invention. The communications system 10 includes a terminal 201, a first access network node 202, a second access network node 203, a mobility management node (MM) 204. The following first describes the network elements.

The terminal 201 may be a smart device, for example, a mobile phone, a tablet computer, a notebook computer, a desktop computer, a palmtop computer, a mobile Internet device (MID), or a wearable device (for example, a smartwatch, a smart band, or a pedometer); or may be a device providing a control service or a forwarding service, for example, a server, a gateway, or a controller; or may be an Internet of Things device, for example, an ammeter, a water meter, a vehicle, a home appliance, a sensor, or another device; or may be another device that can be connected to a network (for example, a wireless cellular network, a wireless fidelity (Wi-Fi) network, a Bluetooth network, an optical network, a ZigBee network, or a wireless sensor network). For ease of description, the terminal may also be briefly referred to as UE subsequently.

The first access network node 202 and the second access network node 203 are two different access network nodes (AN). The AN may be a base station (an NB, an eNB, or a gNB), a wireless access point (Wireless Access Point, AP), a Bluetooth access point, a wired access point (for example, a gateway or a modem), or the like. For ease of description, the first access network node 202 may be referred to as a first AN subsequently, and the second access network node 203 may be referred to as a second AN subsequently.

The mobility management node 204 may be an access and mobility management function (AMF) network element, a mobility management entity (MME), another controller network element or manager network element on a network side, or the like. For ease of description, the mobility management node 104 may be briefly referred to as an MM subsequently. It should be noted that there may be no MM in some embodiments.

In this embodiment of the present invention, the terminal 201 first establishes a communication connection to the first AN. A value of a target parameter used for encryption and integrity protection when data is transmitted between the terminal 201 and the first AN is a first reference value. Subsequently, the terminal 201 is handed over to the second AN to establish a communication connection to the second AN. A value of the target parameter used for encryption and integrity protection when data is transmitted between the terminal 201 and the second AN is a second reference value. The first AN and the second AN may be connected to each other through an interface. The target parameter is a collective term for one or more other parameters that represent a value or values. For example, an attribute of the target parameter includes at least the following several cases. In a first case, the target parameter is a counter, where the counter includes a counting parameter (for example, an HFN) and a sequence number SN. In a second case, the target parameter is a sequence number SN. In the second case, the HFN is used as an example, and the target parameter includes one value or two values. That "the value of the target parameter is the first reference value" may specifically mean that the HFN in the target parameter is the first reference value (in this case, the first reference value includes one value), or may specifically mean that the SN in the target parameter is the first reference value (in this case, the first reference value includes one value), or may specifically mean that the HFN and the SN in the target parameter each are one of two values in the first reference value (in this case, the first reference value includes two values). Optionally, after the terminal is handed over to the second AN to be connected to the second AN, a part of data sent by the terminal to the first AN may need to be sent by the first AN to the second AN. In this case, a value of the target parameter used for encryption and integrity protection when data is transmitted between the first AN and the second AN is the second reference value rather than the first reference value. With reference to a method embodiment shown in FIG. 3A, the following uses a cellular network scenario as an example to describe how each related network element obtains the second reference value.

Figure 3A:
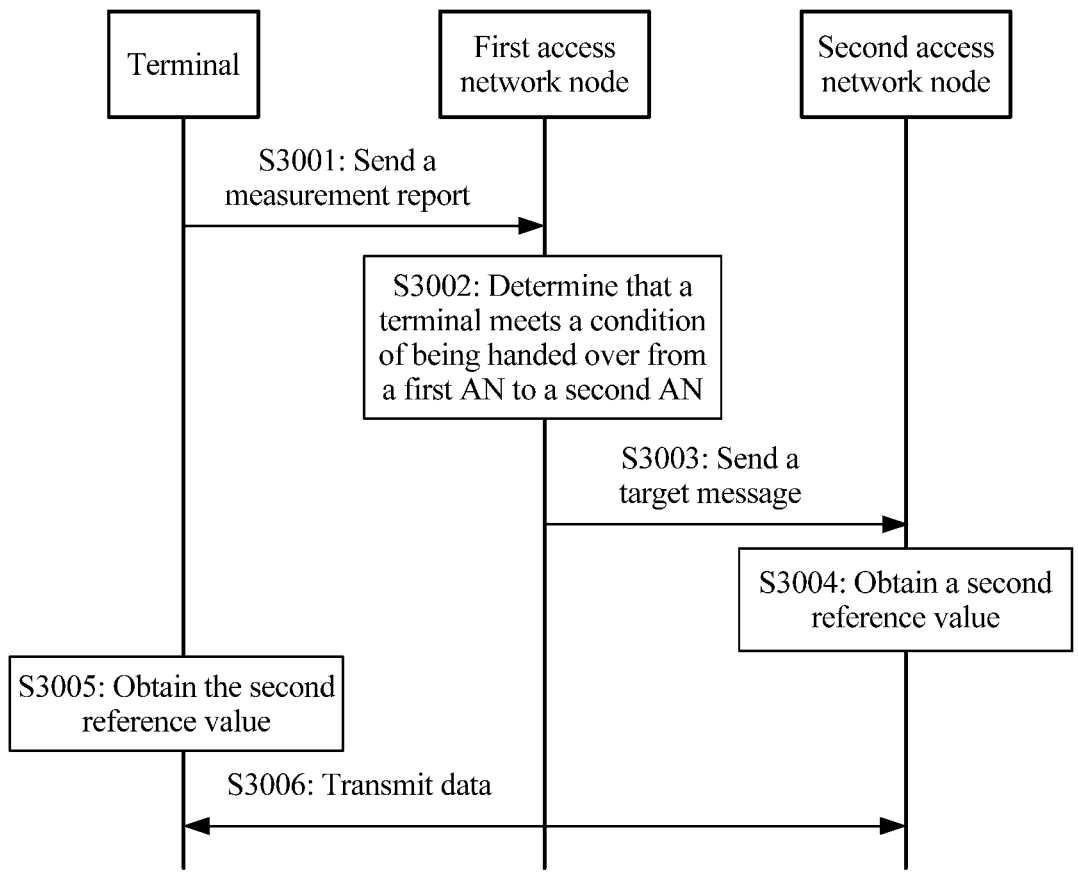
FIG. 3A is a schematic flowchart of a communication method according to an embodiment of the present invention.

FIG. 3A is a schematic flowchart of a communication method according to an embodiment of the present invention. The method may be implemented based on the communications system 20 shown in FIG. 2. During execution, the method includes but is not limited to the following steps.

Step S3001: A terminal sends a measurement report to a first AN.

Specifically, each cell in a cellular network has an AN (for example, a base station) corresponding to the cell. The terminal is currently located in signal coverage of a serving cell and a neighboring cell of the serving cell. In addition to one primary cell (PCell), the serving cell may further include at least one secondary cell (SCell). When the serving cell includes a secondary cell (SCell), a SCell having highest signal strength is a primary secondary cell (PSCell). The terminal establishes a radio connection (RRC connected) by using the primary cell.

The terminal detects in real time signal quality of a cell in which the terminal is located. The signal quality may include at least one of reference signal received power (RSRP) and reference signal received quality (RSRQ), or may include another parameter used to represent signal quality. In this embodiment of the present invention, the PCell in which the terminal is currently located is corresponding to the first AN (in other words, the primary cell is provided by a cell corresponding to the first AN), and the terminal detects signal quality of the current cell in which the terminal is located and sends the measurement report (Measurement Report) to the first AN.

Step S3002: The first AN receives the measurement report, and determines, based on the measurement report, that the terminal meets a condition of being handed over from the first AN to the second AN.

Specifically, the first AN determines, based on the measurement report, whether the terminal meets the cell handover condition. Cell handover herein mainly means switching of the PCell. If the terminal does not meet the cell handover condition, no cell handover procedure is performed; or if the terminal meets the cell handover condition, a cell handover procedure is performed. For a process of determining whether cell handover needs to be performed and how cell handover is performed, refer to an execution manner in the prior art. If the terminal meets a condition of switching the primary cell from one cell to another cell, an AN corresponding to the another cell may be referred to as the second AN, to facilitate subsequent description. In this way, that the terminal meets a condition of switching the primary cell from one cell to another cell may be alternatively described as follows: The terminal meets the condition of being handed over from the first AN to the second AN. In addition, in actual application, there may be a case in which a cell before handover and a cell after handover are corresponding to a same AN. However, the present invention focuses on a case in which the cell before handover and the cell after handover are corresponding to different ANs (that is, the first AN and the second AN are two different ANs).

It should be noted that, when the terminal communicates with the first AN, encryption and/or integrity protection (including three cases: encryption, integrity protection, or encryption and integrity protection) need/needs to be performed on transmitted data. In this embodiment of the present invention, a value of a target parameter used for encryption and/or integrity protection between the terminal and the first AN may be equal to a first reference value. Optionally, the target parameter is a counter, and the counter includes a hyper frame number HFN and a sequence number SN. Optionally, the target parameter is a sequence number SN.

Step S3003: The first AN sends a target message to the second AN, to instruct the second AN to obtain a second reference value.

Specifically, if the first AN determines that the terminal meets the condition of being handed over from the first AN to the second AN, the first AN sends the target message to the second AN. The target message is used to instruct the second AN to obtain the second reference value. The second reference value and the first reference value have a same attribute but different specific values. For example, if the target parameter is a counter, the first reference value is values of an HFN and an SN in the counter, that the value of the target parameter is equal to the first reference value specifically means that HFN=100 and SN=1000, and that a value of the target parameter is equal to the second reference value specifically means that HFN=200 and SN=2000. Alternatively, if the target parameter is a counter, the first reference value is a value of an HFN in the counter, that the value of the target parameter is equal to the first reference value specifically means that HFN=100, and that a value of the target parameter is equal to the second reference value specifically means that HFN=200. Alternatively, if the target parameter is a counter, the first reference value is a value of an SN in the counter, that the value of the target parameter is equal to the first reference value specifically means that SN=1000, and that a value of the target parameter is equal to the second reference value specifically means that SN=2000. Alternatively, if the target parameter is an SN, that the value of the target parameter is equal to the first reference value specifically means that SN=1000, and that a value of the target parameter is equal to the second reference value specifically means that SN=2000. It may be understood that, in addition to the values mentioned in the foregoing examples, the HFN and the SN may have other values. The second reference value is used as a value of the target parameter used for encryption and/or integrity protection when the second AN and the terminal communicate with each other.

Step S3004: The second AN obtains the second reference value based on the target message.

Specifically, the second AN obtains the second reference value in a plurality of possible manners. For example, the first AN generates the second reference value and encapsulates the second reference value into the target message, and the second AN parses the target message to obtain the second reference value. For another example, after receiving the target message, the second AN generates the second reference value. For another example, a related network element (for example, an MM) on a network side generates the second reference value and then sends the second reference value to the second AN, and correspondingly, the second AN receives and obtains the second reference value. For another example, the terminal generates the second reference value and then sends the second reference value to the second AN, and correspondingly, the second AN receives and obtains the second reference value. It should be noted that, when a network element generating the second reference value is another network element other than the first AN and the second AN, the first AN or the second AN may send an instruction (or a "request") to the another network element, to trigger the another network element to generate the second reference value. In addition, if a parameter required for generating the second reference value exists in a network element (or "several network elements") in the communications system, the network element may send the required parameter to a network element generating the second reference value. For example, if the second AN generates the second reference value and a parameter required for generating the second reference value includes the first reference value, the first AN may send the first parameter to the second AN.

A manner of generating the second reference value is not limited herein. In an optional solution, the second reference value may be randomly generated by using a randomized algorithm. In another optional solution, the second reference value may be derived according to a preset rule. For example, a predefined key derivation function may be used, some parameters are used as input of the key derivation function, and output of the key derivation function is the second reference value. Optionally, SN2=function ((at least one of an SN1, a UEID, an ANID1, a key, a nonce, a random number, a C-RNTI, a cell ID, a session ID, an EPS bearer ID, a radio bearer ID, a transport channel ID, a logical channel ID, a "USN", and a "DSN")). The SN2 is the second reference value. The function is a parameter derivation function (for example, a key derivation function (KDF), a hash function, a message authentication code (MAC), or a hash-based message authentication code (HMAC)). The SN1 is the first reference value. The UEID is an identity of the terminal. The ANID1 is an identifier of the first AN. The key is a secure key (for example, an AN key (K_AN1) of the first AN, an encryption key (K_enc), or an integrity protection key (K_int)) shared between the UE and the first AN. The nonce is a fresh parameter. The random number is a random number. The C-RNTI is a cell radio network temporary identifier. The cell ID is a cell identifier. The radio bearer ID is a radio bearer identifier. The transport channel ID is a transport channel identifier. The logical channel ID is a logical channel identifier. The "USN" is a preset uplink character string. The "DSN" is a preset downlink character string.

Step S3005: The terminal is configured to obtain the second reference value.

Specifically, the terminal obtains the second reference value in a plurality of possible manners. For example, the related network element (for example, the MM, the first AN, or the second AN) on the network side generates the second reference value and sends the second reference value to the terminal, and correspondingly, the terminal receives and obtains the second reference value. For another example, the first AN or the second AN sends an instruction to the terminal, and the terminal receives the instruction and generates the second reference value. It should be noted that, when a network element generating the second reference value is another network element other than the first AN and the second AN, the first AN or the second AN may send an instruction (or a "request") to the another network element, to trigger the another network element to generate the second reference value. In addition, if a parameter required for generating the second reference value exists in a network element (or "several network elements") in the communications system, the network element may send the required parameter to a network element generating the second reference value. For example, if the second AN generates the second reference value and a parameter required for generating the second reference value includes the first reference value, the first AN may send the first parameter to the second AN. For example, the UE and a network (for example, the first AN, the second AN, or the MM) respectively generate the second reference value. If a fresh parameter (a parameter that the UE does not have) or an identifier, for example, the nonce or the random number, is used in a process in which the network element on the network side generates the SN2, the network element on the network side needs to send the fresh parameter to the UE, so that the UE uses the fresh parameter when generating the second reference value. If a fresh parameter (a parameter that the UE does not have) or an identifier, for example, the nonce or the random number, is used in a process in which the UE generates the SN2, the UE needs to send the fresh parameter to the network element on the network side, so that the network element on the network side uses the fresh parameter when generating the second reference value.

If the second reference value is generated by the terminal, for a manner of generating the second reference value, refer to the foregoing description.

Step S3006: The terminal transmits data with the second AN.

Specifically, when the terminal transmits the data with the second AN, encryption and/or integrity protection needs to be performed on the transmitted data. The target parameter is used during encryption and/or integrity protection, and the value of the target parameter is the second reference value rather than the first reference value. That "the target parameter is used during encryption and/or integrity protection" includes the following several cases. In a first case, the value of the target parameter is used as a parameter used for encryption and/or integrity protection. In a second case, a parameter derived based on the value of the target parameter is used as a parameter used for encryption and/or integrity protection. In a third case, the target parameter and another parameter value are used together as a parameter used for encryption and/or integrity protection. For example, when the target parameter is a sequence number SN, the SN and the HFN are used together as the parameter used for encryption and/or integrity protection, and in this case, the HFN may be 0 or another default initial value.

It should be noted that a sequence of performing the foregoing steps S3001 to S3006 is not limited herein. Solutions that are obtained by performing the foregoing steps in various sequences and that are logically implementable fall within the scope of the embodiments of the present invention.

In the method described in FIG. 3A, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

It should be noted that the method embodiment shown in FIG. 3A mentions a case in which the manner of generating the second reference value includes a plurality of possible cases. For ease of understanding, the following describes execution procedures of several possible cases in more detail with reference to FIG. 3B to FIG. 3J.

Figure 3B:
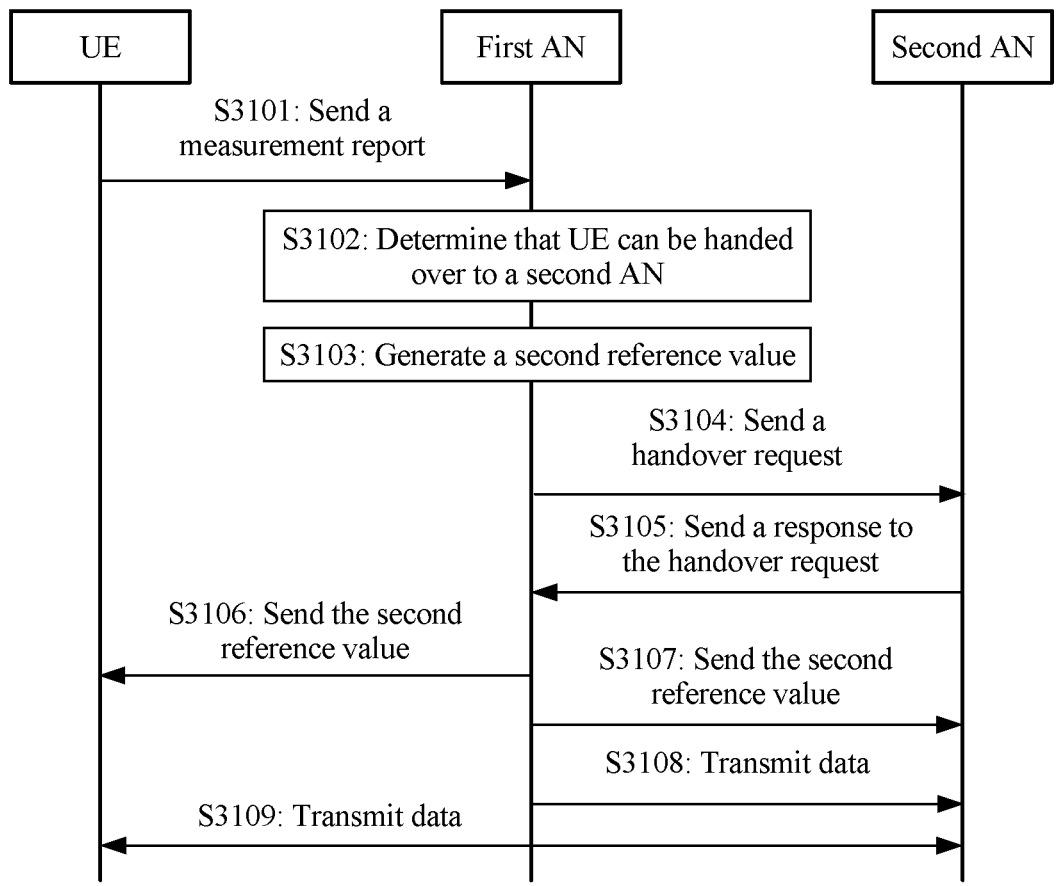
FIG. 3B is a schematic flowchart of another communication method according to an embodiment of the present invention.

FIG. 3B is a schematic flowchart of another communication method according to an embodiment of the present invention. The method includes but is not limited to the following steps, and UE is used below to represent the terminal described above.

Step S3101: The UE sends a measurement report measurement report to a first AN.

Step S3102: The first AN receives the measurement report, and determines, based on the measurement report, that the UE can be handed over to a second AN.

Step S3103: The first AN generates a second reference value, where the second reference value is not equal to the first reference value.

Step S3104: The first AN sends a handover request to the second AN, to request to hand over the UE to a cell corresponding to the second AN.

Step S3105: The second AN receives the handover request, and feeds back, to the first AN, a response to the handover request, where the response to the handover request is used to acknowledge that the UE is to be handed over to the cell corresponding to the second AN.

Step S3106: The first AN receives the response to the handover request, and sends the second reference value to the UE based on the response.

Step S3107: The first AN sends the second reference value to the second AN based on the response.

Step S3108: The first AN sends, to the second AN, data that is from the UE and that is cached before handover, where a value of a target parameter used to perform encryption and/or integrity protection on the data is the second reference value rather than the first reference value.

Step S3109: The UE transmits data with the second AN, where a value of the target parameter used to perform encryption and/or integrity protection on the data is the second reference value rather than the first reference value.

It should be noted that, a sequence of performing some of the foregoing steps S3101 to S3109 may be adjusted, and solutions that are obtained by performing the foregoing steps in various sequences and that are logically implementable fall within the scope of the embodiments of the present invention. For example, the entire solution is logically implementable when step S3103 is performed after step S3105. For another example, the second reference value may be sent to the second AN immediately after step S3103 rather than in step S3107. In a variant solution, the first AN does not generate the second reference value, but generates a parameter X and sends the parameter X to the UE. The UE generates the second reference value based on the parameter X and the first reference value, and the first AN also calculates the second reference value based on the parameter X and the first reference value. Then, the first AN sends the second reference value to the second AN, or the first AN sends both the parameter X and the first reference value to the second AN, so that the second AN calculates the second reference value based on the parameter X and the first reference value. In this way, the second AN and the UE both obtain the second reference value.

Figure 3C:
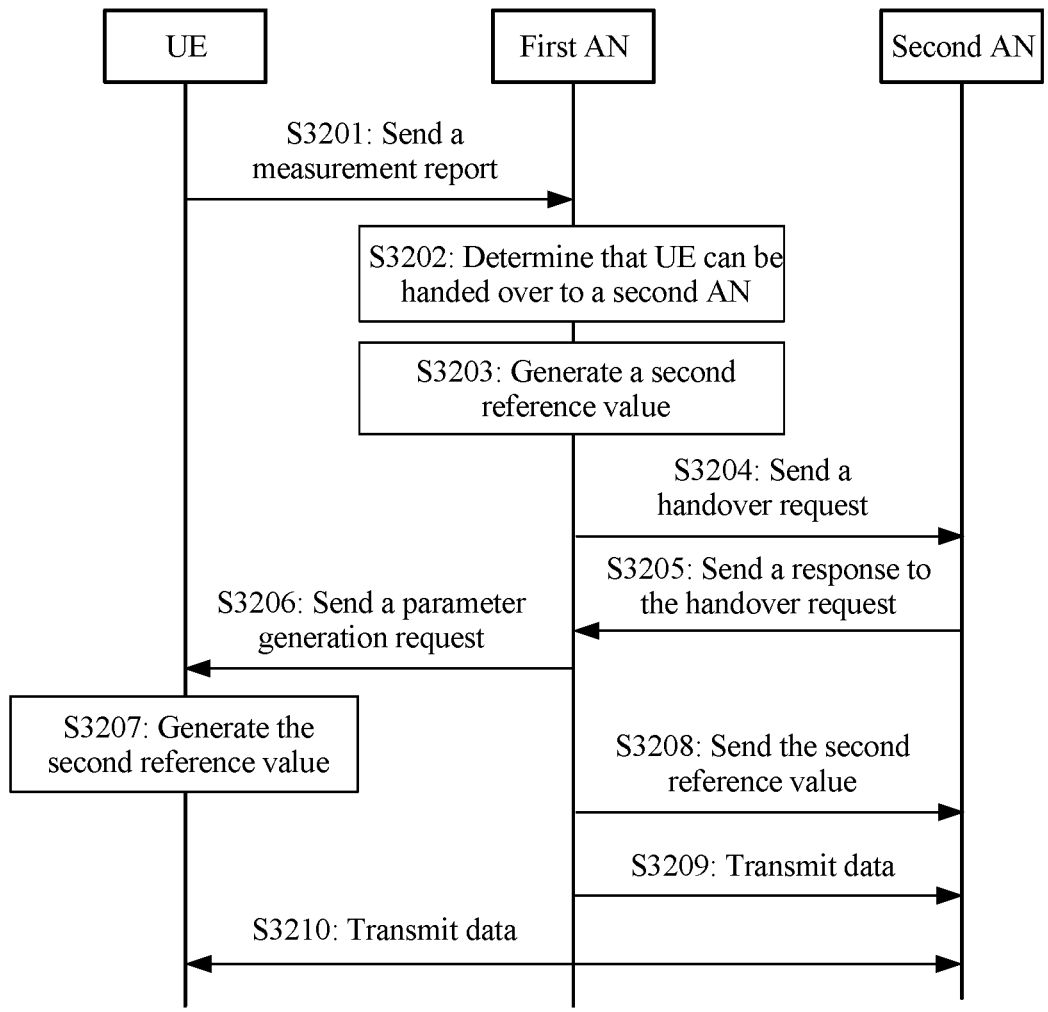
FIG. 3C is a schematic flowchart of another communication method according to an embodiment of the present invention.

FIG. 3C is a schematic flowchart of another communication method according to an embodiment of the present invention. The method includes but is not limited to the following steps, and UE is used below to represent the terminal described above.

Step S3201: The UE sends a measurement report measurement report to a first AN.

Step S3202: The first AN receives the measurement report, and determines, based on the measurement report, that the UE can be handed over to a second AN.

Step S3203: The first AN generates a second reference value, where the second reference value is not equal to the first reference value.

Step S3204: The first AN sends a handover request to the second AN, to request to hand over the UE to a cell corresponding to the second AN.

Step S3205: The second AN receives the handover request, and feeds back, to the first AN, a response to the handover request, where the response to the handover request is used to acknowledge that the UE is to be handed over to the cell corresponding to the second AN.

Step S3206: The first AN receives the response to the handover request, and sends a parameter generation request to the UE based on the response, where the parameter generation request is control information or signaling. Optionally, the parameter generation request may be a response to the measurement report, to indicate that it is acknowledged that the UE can be handed over to the cell corresponding to the second AN. Optionally, the parameter generation request includes an indicator, to instruct the UE to generate the second reference value. For the parameter generation request in another embodiment, refer to the description herein.

Step S3207: The UE receives the parameter generation request, and generates the second reference value, where the parameter generation request may be considered as a trigger condition of generating the second reference value. Optionally, the UE may identify the indicator in the parameter generation request, to trigger generation of the second reference value. For the parameter generation request in another embodiment, refer to the description herein.

Step S3208: The first AN sends the second reference value to the second AN based on the response to the handover request.

Step S3209: The first AN sends, to the second AN, data that is from the UE and that is cached before handover, where a value of a target parameter used to perform encryption and/or integrity protection on the data is the second reference value rather than the first reference value.

Step S3210: The UE transmits data with the second AN, where a value of the target parameter used to perform encryption and/or integrity protection on the data is the second reference value rather than the first reference value.

It should be noted that, a sequence of performing some of the foregoing steps S3201 to S3210 may be adjusted, and solutions that are obtained by performing the foregoing steps in various sequences and that are logically implementable fall within the scope of the embodiments of the present invention. For example, the entire solution is logically implementable when step S3203 is performed after step S3205. For another example, the second reference value may be sent to the second AN immediately after step S3203 rather than in step S3208. In a variant solution, the first AN and the terminal do not generate the second reference value but generate a parameter X. Subsequently, the terminal and the first AN both generate the second reference value based on the parameter X and the first reference value. Then, the first AN sends the second reference value to the second AN, or the first AN sends both the parameter X and the first reference value to the second AN, so that the second AN calculates the second reference value based on the parameter X and the first reference value. In this way, the second AN and the UE both obtain the second reference value.

Figure 3D:
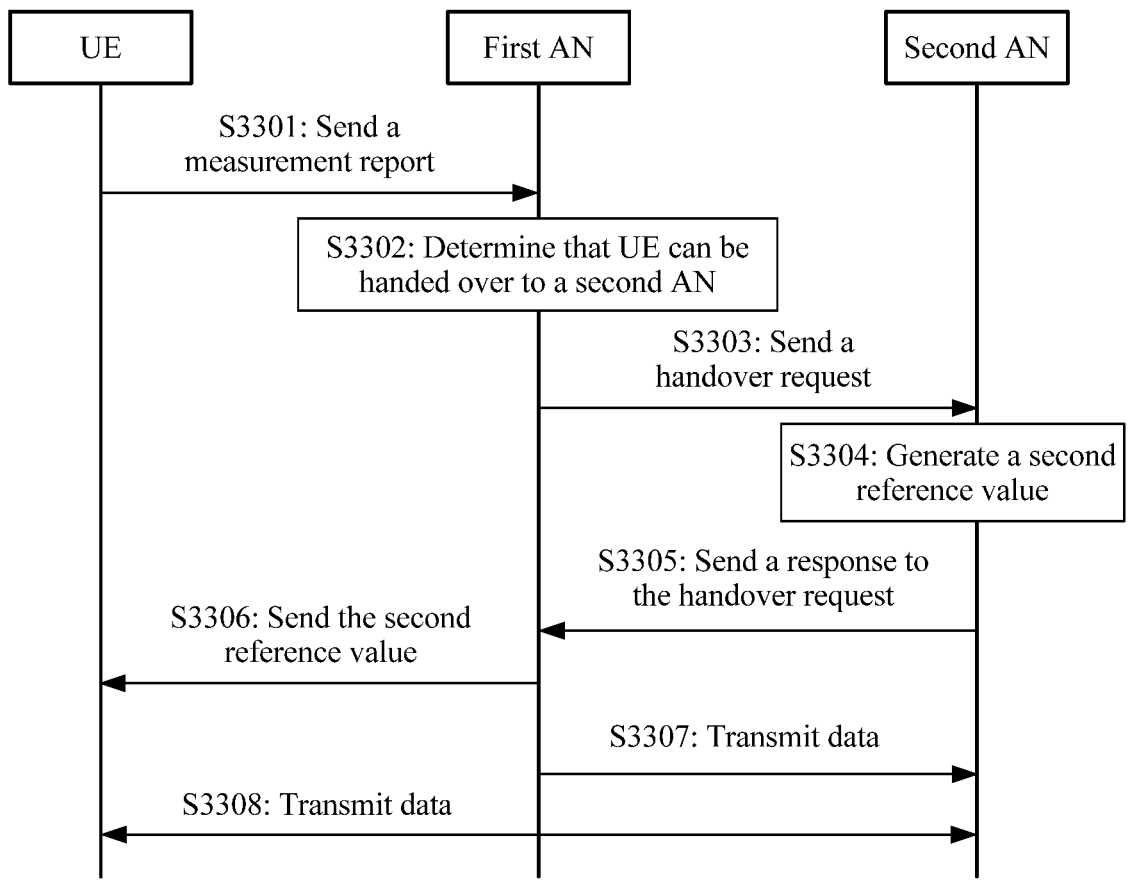
FIG. 3D is a schematic flowchart of another communication method according to an embodiment of the present invention.

FIG. 3D is a schematic flowchart of another communication method according to an embodiment of the present invention. The method includes but is not limited to the following steps, and UE is used below to represent the terminal described above.

Step S3301: The UE sends a measurement report measurement report to a first AN.

Step S3302: The first AN receives the measurement report, and determines, based on the measurement report, that the UE can be handed over to a second AN.

Step S3303: The first AN sends a handover request to the second AN, to request to hand over the UE to a cell corresponding to the second AN.

Step S3304: The second AN receives the handover request, and generates a second reference value based on the handover request, where the second reference value is not equal to the first reference value.

Step S3305: The second AN sends, to the first AN, a response to the handover request, where the response to the handover request is used to acknowledge that the UE is to be handed over to the cell corresponding to the second AN, and the response includes the second reference value.

Step S3306: The first AN receives the response to the handover request, parses out the second reference value in the response, and then sends the second reference value to the UE.

Step S3307: The first AN sends, to the second AN, data that is from the UE and that is cached before handover, where a value of a target parameter used to perform encryption and/or integrity protection on the data is the second reference value rather than the first reference value.

Step S3308: The UE transmits data with the second AN, where a value of the target parameter used to perform encryption and/or integrity protection on the data is the second reference value rather than the first reference value.

It should be noted that, a sequence of performing some of the foregoing steps S3301 to S3308 may be adjusted, and solutions that are obtained by performing the foregoing steps in various sequences and that are logically implementable fall within the scope of the embodiments of the present invention. For example, the entire solution is logically implementable when step S3307 is performed after step S3308. In a variant solution, the second AN does not generate the second reference value, but generates a parameter X and sends the parameter X to the first AN. The first AN sends the parameter X to the UE. The UE generates the second reference value based on the parameter X and the first reference value, and the first AN also calculates the second reference value based on the parameter X and the first reference value. Then, the first AN sends the second reference value to the second AN, or the first AN sends the first reference value to the second AN, so that the second AN calculates the second reference value based on the parameter X and the first reference value. In this way, the second AN and the UE both obtain the second reference value. In another variant solution, after generating the second reference value, the second AN directly sends the second reference value to the UE, but does not send the second reference value to the first AN. The first AN does not need to perform step S3307.

Figure 3E:
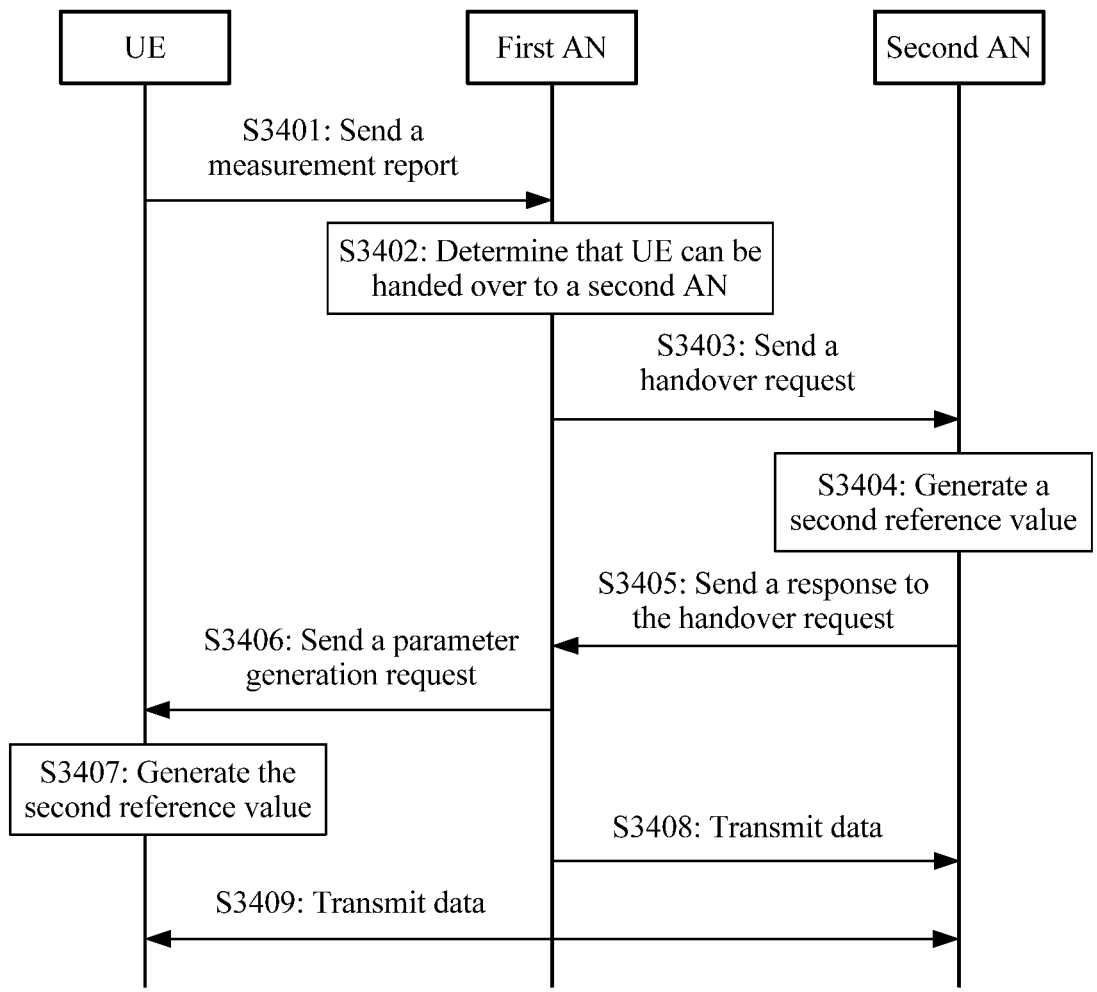
FIG. 3E is a schematic flowchart of another communication method according to an embodiment of the present invention.

FIG. 3E is a schematic flowchart of another communication method according to an embodiment of the present invention. The method includes but is not limited to the following steps, and UE is used below to represent the terminal described above.

Step S3401: The UE sends a measurement report measurement report to a first AN.

Step S3402: The first AN receives the measurement report, and determines, based on the measurement report, that the UE can be handed over to a second AN.

Step S3403: The first AN sends a handover request to the second AN, to request to hand over the UE to a cell corresponding to the second AN.

Step S3404: The second AN receives the handover request, and generates a second reference value based on the handover request, where the second reference value is not equal to the first reference value.

Step S3405: The second AN sends, to the first AN, a response to the handover request, where the response to the handover request is used to acknowledge that the UE is to be handed over to the cell corresponding to the second AN.

Step S3406: The first AN receives the response to the handover request, and sends a parameter generation request to the UE, to indicate that it is acknowledged that the UE can be handed over to the cell corresponding to the second AN, where the response to the handover request may be considered as a trigger condition of sending the parameter generation request. Optionally, the parameter generation request includes an indicator, to instruct the UE to generate the second reference value. For the parameter generation request in another embodiment, refer to the description herein.

Step S3407: The UE receives the parameter generation request, and generates the second reference value, where the parameter generation request may be considered as a trigger condition of generating the second reference value. Optionally, the UE may identify the indicator in the parameter generation request, to trigger generation of the second reference value. For the parameter generation request in another embodiment, refer to the description herein.

Step S3408: The first AN sends, to the second AN, data that is from the UE and that is cached before handover, where a value of a target parameter used to perform encryption and/or integrity protection on the data is the second reference value rather than the first reference value.

Step S3409: The UE transmits data with the second AN, where a value of the target parameter used to perform encryption and/or integrity protection on the data is the second reference value rather than the first reference value.

It should be noted that, a sequence of performing some of the foregoing steps S3401 to S3409 may be adjusted, and solutions that are obtained by performing the foregoing steps in various sequences and that are logically implementable fall within the scope of the embodiments of the present invention. For example, the entire solution is logically implementable when step S3408 is performed after step S3409. In a variant solution, the second AN does not generate the second reference value, but generates a parameter X and sends the parameter X to the first AN. The first AN calculates the second reference value based on the parameter X and the first reference value. Then, the first AN sends the second reference value to the second AN, or the first AN sends the first reference value to the second AN, so that the second AN calculates the second reference value based on the parameter X and the first reference value. Similarly, the UE also generates the parameter X in a same manner, and then generates a second parameter based on the parameter X and the first reference value. In this way, the second AN and the UE both obtain the second reference value.

Figure 3F:
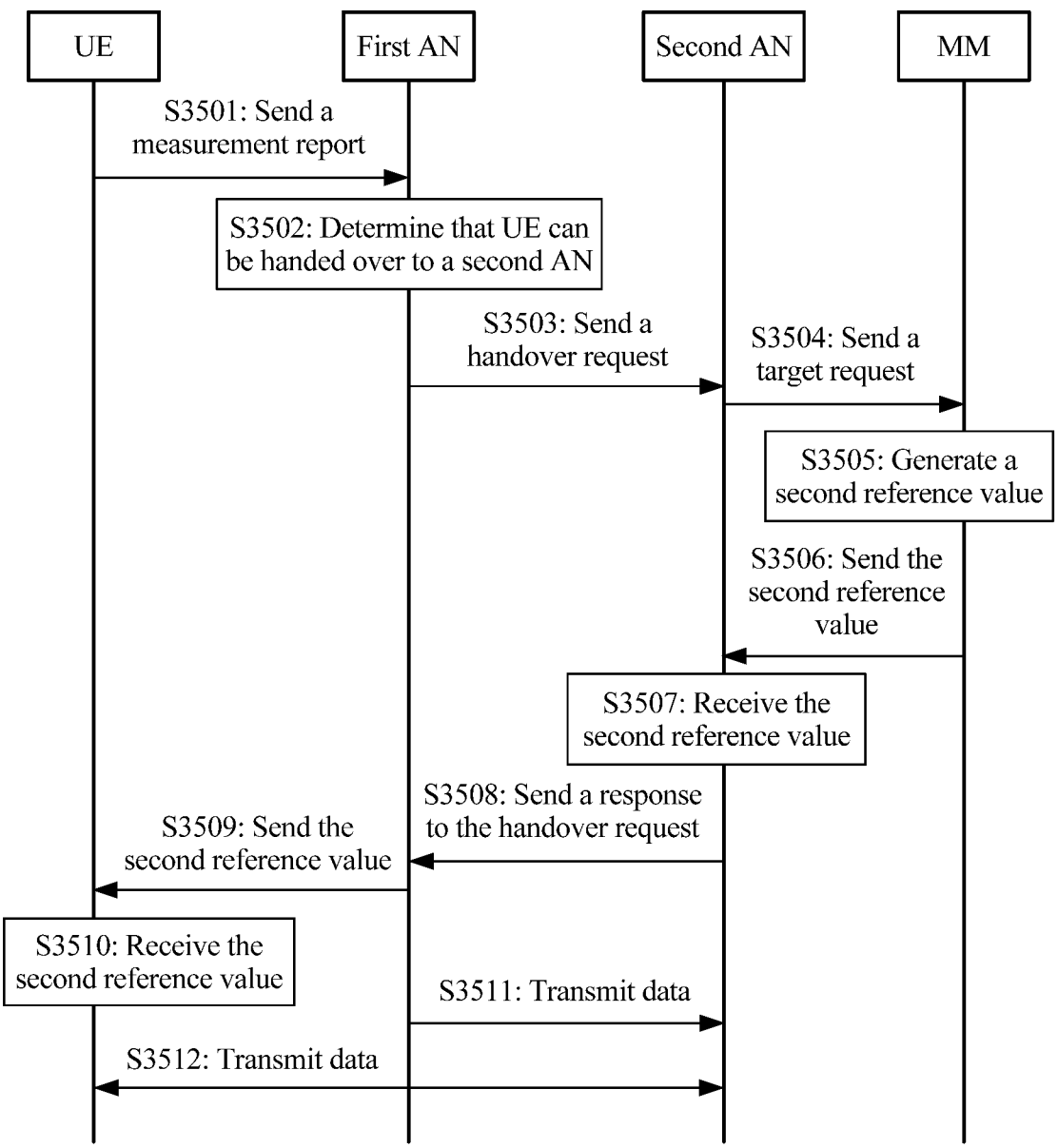
FIG. 3F is a schematic flowchart of another communication method according to an embodiment of the present invention.

FIG. 3F is a schematic flowchart of another communication method according to an embodiment of the present invention. The method includes but is not limited to the following steps, and UE is used below to represent the terminal described above.

Step S3501: The UE sends a measurement report measurement report to a first AN.

Step S3502: The first AN receives the measurement report, and determines, based on the measurement report, that the UE can be handed over to a second AN.

Step S3503: The first AN sends a handover request to the second AN, to request to hand over the UE to a cell corresponding to the second AN.

Step S3504: The second AN receives the handover request, and sends a target request to an MM based on the handover request, where the handover request may be considered as a trigger condition of sending the target request by the second AN.

Step S3505: The MM receives the target request, and generates a second reference value, where the target request may be considered as a trigger condition of generating the second reference value by the MM, and the second reference value is not equal to the first reference value.

Step S3506: The MM sends the second reference value to the second AN.

Step S3507: The second AN receives the second reference value.

Step S3508: The second AN sends, to the first AN, a response to the handover request, where the response to the handover request is used to acknowledge that the UE is to be handed over to the cell corresponding to the second AN, and the response includes the second reference value.

Step S3509: The first AN receives the response to the handover request, and sends the second reference value to the UE, where the response to the handover request may be considered as a trigger condition of sending the second reference value.

Step S3510: The UE receives the second reference value.

Step S3511: The first AN sends, to the second AN, data that is from the UE and that is cached before handover, where a value of a target parameter used to perform encryption and/or integrity protection on the data is the second reference value rather than the first reference value.

Step S3512: The UE transmits data with the second AN, where a value of the target parameter used to perform encryption and/or integrity protection on the data is the second reference value rather than the first reference value.

It should be noted that, a sequence of performing some of the foregoing steps S3501 to S3512 may be adjusted, and solutions that are obtained by performing the foregoing steps in various sequences and that are logically implementable fall within the scope of the embodiments of the present invention. For example, the entire solution is logically implementable when step S3511 is performed after step S3512. In a variant solution, the MM does not generate the second reference value, but generates a parameter X and sends the parameter X to the first AN. The first AN also sends the parameter X to the UE. The UE and the first AN both calculate the second reference value based on the parameter X and the first reference value. Then, the first AN sends the second reference value to the second AN, or the first AN sends the first reference value and the parameter X to the second AN, so that the second AN calculates the second reference value based on the parameter X and the first reference value. In this way, the second AN and the UE both obtain the second reference value. In another variant solution, after obtaining the second reference value, the second AN does not send the second reference value to the first AN, but directly sends the second reference value to the UE. In another variant solution, after generating the second reference value, the MM directly sends the second reference value to each of the second AN and the UE, and the first AN does not need to obtain the second reference value. In another variant solution, after generating the second reference value, the MM sends the second reference value to the first AN, but does not need to send the second reference value to the second AN. Subsequently, the first AN sends the second reference value to the UE and the second AN.

Figure 3G:
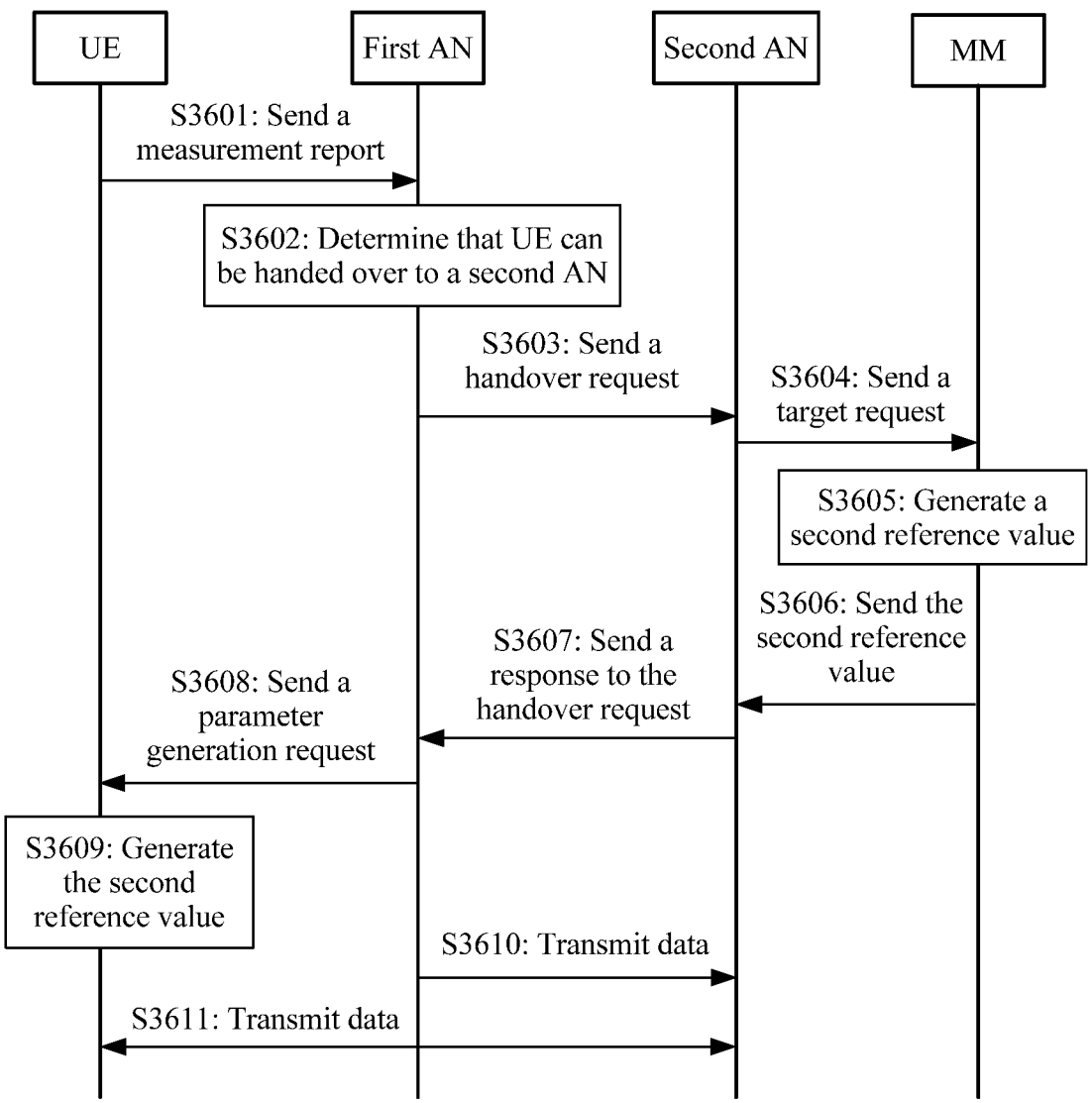
FIG. 3G is a schematic flowchart of another communication method according to an embodiment of the present invention.

FIG. 3G is a schematic flowchart of another communication method according to an embodiment of the present invention. The method includes but is not limited to the following steps, and UE is used below to represent the terminal described above.

Step S3601: The UE sends a measurement report measurement report to a first AN.

Step S3602: The first AN receives the measurement report, and determines, based on the measurement report, that the UE can be handed over to a second AN.

Step S3603: The first AN sends a handover request to the second AN, to request to hand over the UE to a cell corresponding to the second AN.

Step S3604: The second AN receives the handover request, and sends a target request to an MM based on the handover request, where the handover request may be considered as a trigger condition of sending the target request by the second AN.

Step S3605: The MM receives the target request, and generates a second reference value, where the target request may be considered as a trigger condition of generating the second reference value by the MM, and the second reference value is not equal to the first reference value.

Step S3606: The MM sends the second reference value to the second AN.

Step S3607: The second AN sends, to the first AN, a response to the handover request, where the response to the handover request is used to acknowledge that the UE is to be handed over to the cell corresponding to the second AN.

Step S3608: The first AN receives the response to the handover request, and sends a parameter generation request to the UE, to indicate that it is acknowledged that the UE can be handed over to the cell corresponding to the second AN, where the response to the handover request may be considered as a trigger condition of sending the parameter generation request.

Step S3609: The UE receives the parameter generation request, and generates the second reference value, where the parameter generation request may be considered as a trigger condition of generating the second reference value.

Step S3610: The first AN sends, to the second AN, data that is from the UE and that is cached before handover, where a value of a target parameter used to perform encryption and/or integrity protection on the data is the second reference value rather than the first reference value.

Step S3611: The UE transmits data with the second AN, where a value of the target parameter used to perform encryption and/or integrity protection on the data is the second reference value rather than the first reference value.

It should be noted that, a sequence of performing some of the foregoing steps S3601 to S3611 may be adjusted, and solutions that are obtained by performing the foregoing steps in various sequences and that are logically implementable fall within the scope of the embodiments of the present invention. For example, the entire solution is logically implementable when step S3610 is performed after step S3611. In a variant solution, the MM does not generate the second reference value, but generates a parameter X and sends the parameter X to the second AN. The second AN sends the parameter X to the first AN. The first AN calculates the second reference value based on the parameter X and the first reference value. Then, the first AN sends the second reference value to the second AN, or the first AN sends the first reference value to the second AN, so that the second AN calculates the second reference value based on the parameter X and the first reference value. Similarly, the UE also generates the parameter X in a same manner, and then generates a second parameter based on the parameter X and the first reference value. In this way, the second AN and the UE both obtain the second reference value. In another variant solution, the MM does not generate the second reference value, but generates a parameter X and sends the parameter X to the second AN. The first AN also sends the first reference value to the second AN. The second AN generates the second reference value based on the parameter X and the first reference value. Similarly, the UE also generates the parameter X in a same manner, and then generates a second parameter based on the parameter X and the first reference value. In this way, the second AN and the UE both obtain the second reference value.

Figure 3H:
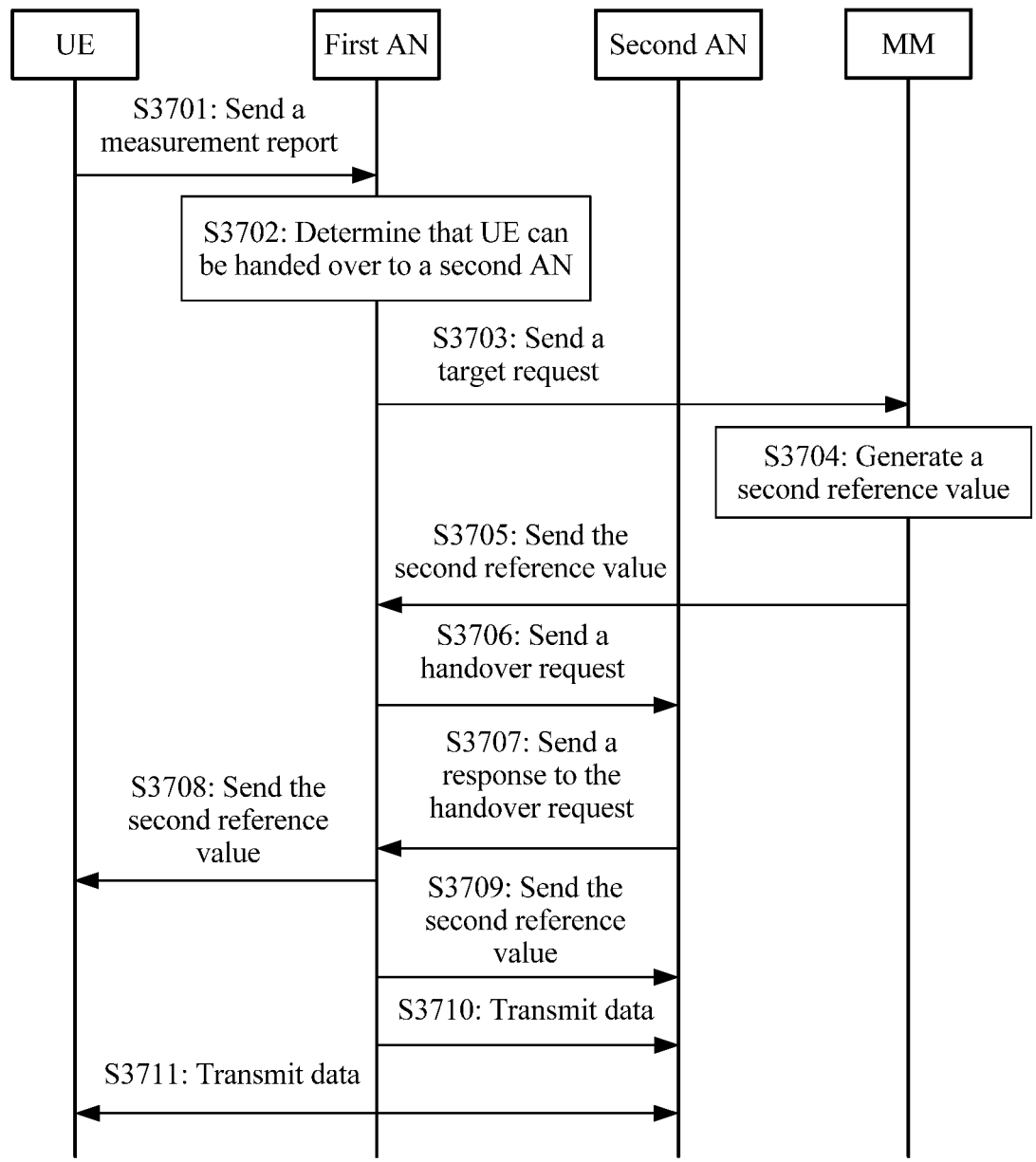
FIG. 3H is a schematic flowchart of another communication method according to an embodiment of the present invention.

FIG. 3H is a schematic flowchart of another communication method according to an embodiment of the present invention. The method includes but is not limited to the following steps, and UE is used below to represent the terminal described above.

Step S3701: The UE sends a measurement report measurement report to a first AN.

Step S3702: The first AN receives the measurement report, and determines, based on the measurement report, that the UE can be handed over to a second AN.

Step S3703: The first AN sends a target request to an MM, to request the MM to generate a second reference value.

Step S3704: The MM receives the target request, and generates the second reference value, where the target request may be considered as a trigger condition of generating the second reference value by the MM, and the second reference value is not equal to the first reference value.

Step S3705: The MM sends the second reference value to the first AN.

Step S3706: The first AN receives the second reference value, and sends a handover request to the second AN, to request to hand over the UE to a cell corresponding to the second AN.

Step S3707: The second AN receives the handover request, and sends, to the first AN, a response to the handover request, where the response to the handover request is used to acknowledge that the UE is to be handed over to the cell corresponding to the second AN.

Step S3708: The first AN receives the response to the handover request, and sends the second reference value to the UE, where the response to the handover request may be considered as a trigger condition of sending the second reference value by the UE.

Step S3709: The first AN sends the second reference value to the second AN.

Step S3710: The first AN sends, to the second AN, data that is from the UE and that is cached before handover, where a value of a target parameter used to perform encryption and/or integrity protection on the data is the second reference value rather than the first reference value.

Step S3711: The UE transmits data with the second AN, where a value of the target parameter used to perform encryption and/or integrity protection on the data is the second reference value rather than the first reference value.

It should be noted that, a sequence of performing some of the foregoing steps S3701 to S3711 may be adjusted, and solutions that are obtained by performing the foregoing steps in various sequences and that are logically implementable fall within the scope of the embodiments of the present invention. For example, the entire solution is logically implementable when step S3710 is performed after step S3711. In a variant solution, the MM does not generate the second reference value, but generates a parameter X and sends the parameter X to the first AN. The first AN also sends the parameter X to the UE. The UE and the first AN both calculate the second reference value based on the parameter X and the first reference value. Then, the first AN sends the second reference value to the second AN, or the first AN sends the first reference value and the parameter X to the second AN, so that the second AN calculates the second reference value based on the parameter X and the first reference value. In this way, the second AN and the UE both obtain the second reference value.

Figure 3I:
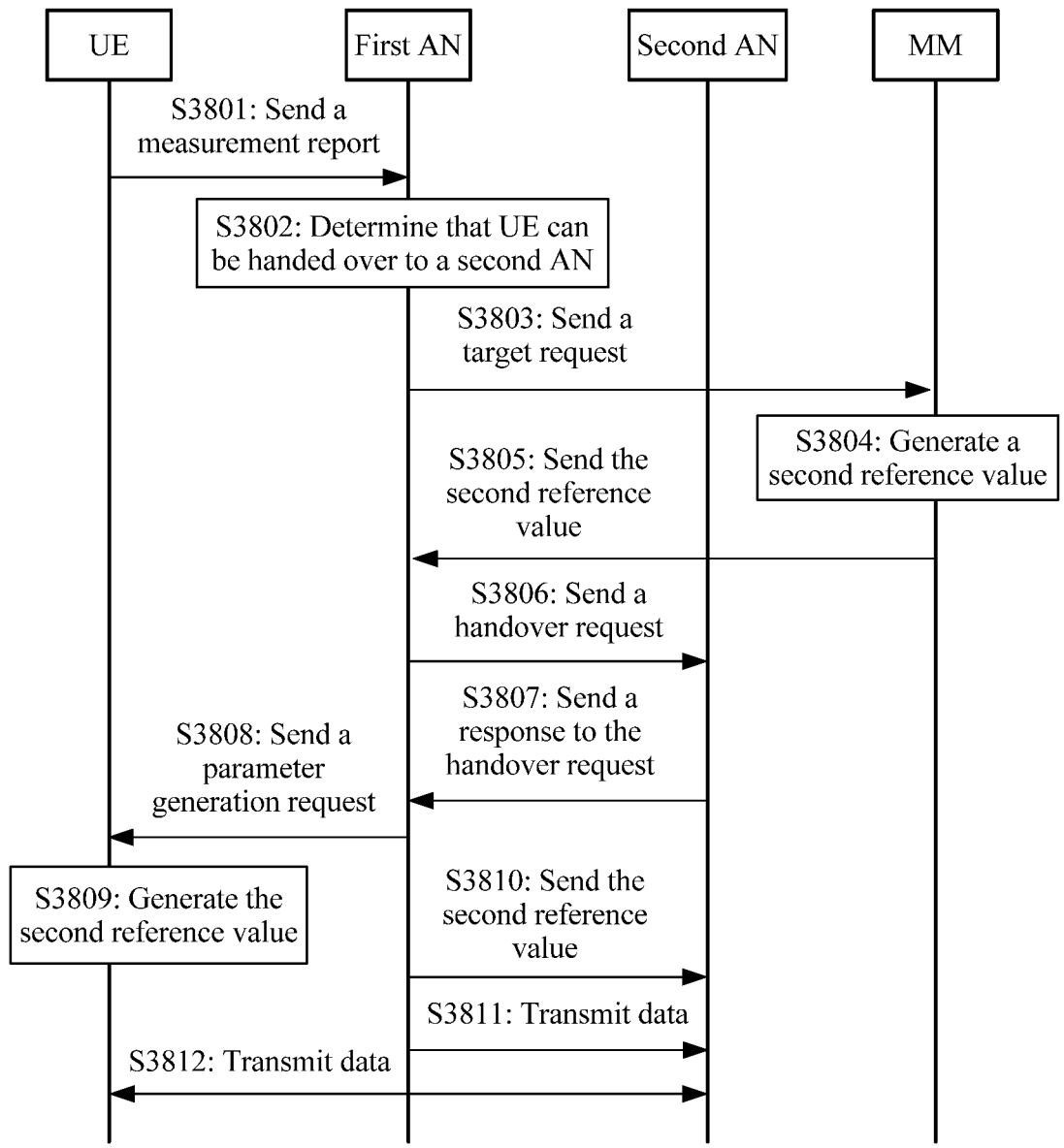
FIG. 3I is a schematic flowchart of another communication method according to an embodiment of the present invention.

FIG. 3I is a schematic flowchart of another communication method according to an embodiment of the present invention. The method includes but is not limited to the following steps, and UE is used below to represent the terminal described above.

Step S3801: The UE sends a measurement report measurement report to a first AN.

Step S3802: The first AN receives the measurement report, and determines, based on the measurement report, that the UE can be handed over to a second AN.

Step S3803: The first AN sends a target request to an MM, to request the MM to generate a second reference value.

Step S3804: The MM receives the target request, and generates the second reference value, where the target request may be considered as a trigger condition of generating the second reference value by the MM, and the second reference value is not equal to the first reference value.

Step S3805: The MM sends the second reference value to the first AN.

Step S3806: The first AN receives the second reference value, and sends a handover request to the second AN, to request to hand over the UE to a cell corresponding to the second AN.

Step S3807: The second AN receives the handover request, and sends, to the first AN, a response to the handover request, where the response to the handover request is used to acknowledge that the UE is to be handed over to the cell corresponding to the second AN.

Step S3808: The first AN receives the response to the handover request, and sends a parameter generation request to the UE, to indicate that it is acknowledged that the UE can be handed over to the cell corresponding to the second AN, where the response to the handover request may be considered as a trigger condition of sending the parameter generation request.

Step S3809: The UE receives the parameter generation request, and generates the second reference value, where the parameter generation request may be considered as a trigger condition of generating the second reference value.

Step S3810: The first AN sends the second reference value to the second AN.

Step S3811: The first AN sends, to the second AN, data that is from the UE and that is cached before handover, where a value of a target parameter used to perform encryption and/or integrity protection on the data is the second reference value rather than the first reference value.

Step S3812: The UE transmits data with the second AN, where a value of the target parameter used to perform encryption and/or integrity protection on the data is the second reference value rather than the first reference value.

It should be noted that, a sequence of performing some of the foregoing steps S3801 to S3812 may be adjusted, and solutions that are obtained by performing the foregoing steps in various sequences and that are logically implementable fall within the scope of the embodiments of the present invention. For example, the entire solution is logically implementable when step S3811 is performed after step S3812. In a variant solution, the MM does not generate the second reference value, but generates a parameter X and sends the parameter X to the first AN. The first AN calculates the second reference value based on the parameter X and the first reference value. Then, the first AN sends the second reference value to the second AN, or the first AN sends the first reference value and the parameter X to the second AN, so that the second AN calculates the second reference value based on the parameter X and the first reference value. Similarly, the UE also generates the parameter X in a same manner, and then generates a second parameter based on the parameter X and the first reference value. In this way, the second AN and the UE both obtain the second reference value.

Figure 3J:
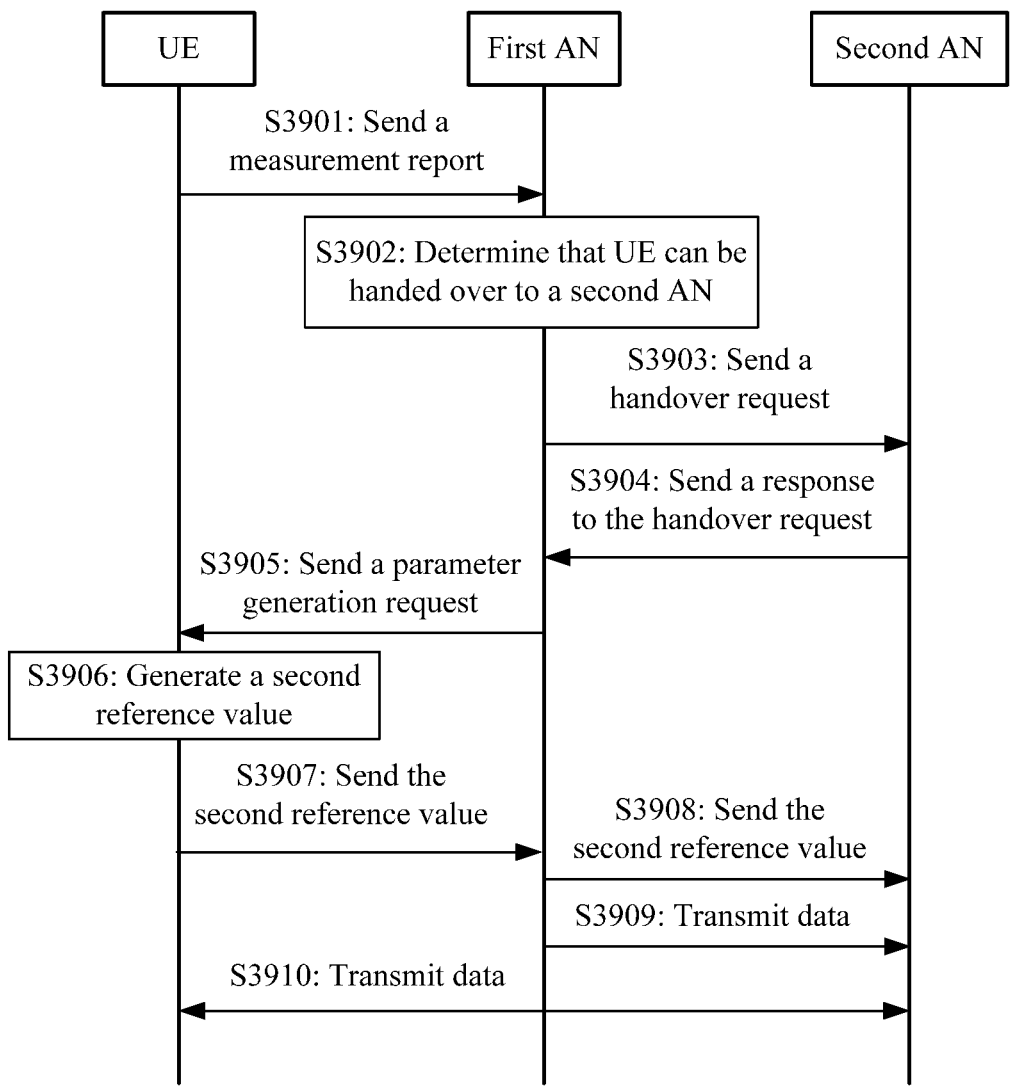
FIG. 3J is a schematic flowchart of another communication method according to an embodiment of the present invention.

FIG. 3J is a schematic flowchart of another communication method according to an embodiment of the present invention. The method includes but is not limited to the following steps, and UE is used below to represent the terminal described above.

Step S3901: The UE sends a measurement report measurement report to a first AN.

Step S3902: The first AN receives the measurement report, and determines, based on the measurement report, that the UE can be handed over to a second AN.

Step S3903: The first AN sends a handover request to the second AN, to request to hand over the UE to a cell corresponding to the second AN.

Step S3904: The second AN sends, to the first AN, a response to the handover request, where the response to the handover request is used to acknowledge that the UE is to be handed over to the cell corresponding to the second AN.

Step S3905: The first AN sends a parameter generation request to the UE, to indicate that it is acknowledged that the UE can be handed over to the cell corresponding to the second AN.

Step S3906: The UE receives the parameter generation request, and generates a second reference value, where the parameter generation request may be considered as a trigger condition of generating the second reference value, and the second reference value is not equal to the first reference value.

Step S3907: The UE sends the second reference value to the first AN.

Step S3908: The first AN sends the second reference value to the second AN.

Step S3909: The first AN sends, to the second AN, data that is from the UE and that is cached before handover, where a value of a target parameter used to perform encryption and/or integrity protection on the data is the second reference value rather than the first reference value.

Step S3910: The UE transmits data with the second AN, where a value of the target parameter used to perform encryption and/or integrity protection on the data is the second reference value rather than the first reference value.

It should be noted that, a sequence of performing some of the foregoing steps S3901 to S3910 may be adjusted, and solutions that are obtained by performing the foregoing steps in various sequences and that are logically implementable fall within the scope of the embodiments of the present invention. For example, the entire solution is logically implementable when step S3909 is performed after step S3910. Possibly, the UE does not send the second reference value to the first AN, but directly sends the second reference value to the second AN. In this way, there is no step S3907. In another variant solution, the UE does not generate the second reference value, but generates a parameter X and sends the parameter X to the first AN. The first AN calculates the second reference value based on the parameter X and the first reference value. Then, the first AN sends the second reference value to the second AN, or the first AN sends the first reference value and the parameter X to the second AN, so that the second AN calculates the second reference value based on the parameter X and the first reference value. The UE also generates a second parameter based on the parameter X and the first reference value in a same manner. In this way, the second AN and the UE both obtain the second reference value.

The foregoing describes some solutions of the embodiments of the present invention in more detail with reference to FIG. 3B to FIG. 3J. The solutions are only used as examples for description. In addition to the listed solutions, there are other solutions obtained through change based on the ideas of the embodiments of the present invention, and the solutions all fall within the protection scope of this application. In addition, the parameter X mentioned in the foregoing embodiments is a general concept. During specific embodiments, the parameter X may be specified as a parameter as required, and is used as input for generating the second reference value.

The foregoing describes in detail the method in the embodiments of the present invention, and the following provides an apparatus in the embodiments of the present invention.

Figure 4:
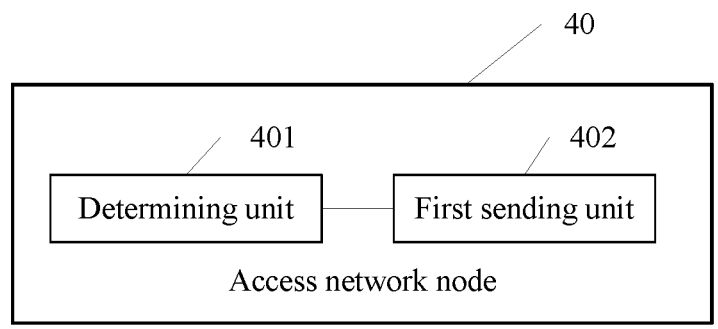
FIG. 4 is a schematic structural diagram of an access network node according to an embodiment of the present invention.

FIG. 4 is a schematic structural diagram of an access network node 40 according to an embodiment of the present invention. The access network node 40 may be referred to as a first AN, the first AN includes a determining unit 401 and a first sending unit 402, and the units are described as follows:

The determining unit 401 is configured to determine that a terminal accessing the first AN meets a condition of being handed over from the first AN to a second AN, where a value of a target parameter used for encryption and/or integrity protection when the terminal and the first AN communicate with each other before the terminal is handed over to the second AN is equal to a first reference value, and the target parameter is a counter or a sequence number SN. The first sending unit 402 is configured to send a target message to the second AN, to instruct the second AN to obtain a second reference value, where the second reference value is used as a value of the target parameter used for encryption and/or integrity protection when the second AN and the terminal communicate with each other.

The foregoing units are run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In an optional solution, the first AN further includes a second processing unit, where the second processing unit is configured to, before the first sending unit 402 sends the target message to the second AN to instruct the second AN to obtain the second reference value, send a target request to an MM to request the MM to generate the second reference value, and receive the second reference value that is generated by the MM based on the target request and that is sent by the MM, where the target message includes the second reference value.

In another optional solution, the first AN further includes a calculation unit, where the calculation unit is configured to, before the first sending unit 402 sends the target message to the second AN to instruct the second AN to obtain the second reference value, randomly generate the second reference value by using a randomized algorithm, or derive the second reference value according to a preset rule, where the target message includes the second reference value.

In another optional solution, the first AN further includes a second sending unit, where the second sending unit is configured to send the second reference value to the terminal.

In another optional solution, the first AN further includes a third sending unit, where the third sending unit is configured to send a parameter generation request to the terminal, so that the terminal randomly generates the second reference value based on the parameter generation request by using the randomized algorithm, or derives the second reference value based on the parameter generation request according to the preset rule.

It should be noted that for embodiment of the units, refer to corresponding descriptions in the method embodiment shown in FIG. 3A.

According to the access network node 40 described in FIG. 4, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 5:
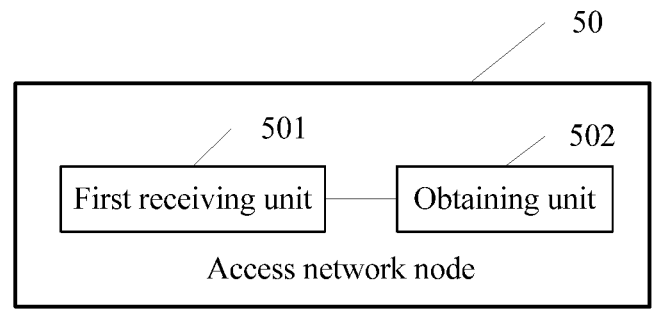
FIG. 5 is a schematic structural diagram of another access network node according to an embodiment of the present invention.

FIG. 5 is a schematic structural diagram of an access network node 50 according to an embodiment of the present invention. The access network node 50 is a second AN, the second AN includes a first receiving unit 501 and an obtaining unit 502, and the units are described as follows:

The first receiving unit 501 is configured to receive a target message sent by a first AN, where the target message is a message sent by the first AN when the first AN determines that the terminal meets a condition of being handed over from the first AN to the second AN, a value of a target parameter used for encryption and/or integrity protection when the terminal and the first AN communicate with each other before the terminal is handed over to the second AN is equal to a first reference value, and the target parameter is a counter or a sequence number SN. The obtaining unit 502 is configured to obtain a second reference value based on the target message, where the second reference value is used as a value of the target parameter used for encryption and/or integrity protection when the second AN and the terminal communicate with each other.

The foregoing units are run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In another optional solution, the target message includes the second reference value, and that the obtaining unit 502 obtains a second reference value based on the target message is specifically: parsing out the second reference value from the target message.

In another optional solution, that the obtaining unit 502 obtains a second reference value based on the target message is specifically: randomly generating the second reference value based on the target message by using a randomized algorithm, or deriving the second reference value based on the target message according to a preset rule.

In another optional solution, that the obtaining unit 502 obtains a second reference value based on the target message is specifically: sending a target request to an MM based on the target message, to request the MM to generate the second reference value; and receiving the second reference value sent by the MM.

In another optional solution, the second AN further includes a fourth sending unit, where the fourth sending unit is configured to, after the obtaining unit 502 obtains the second reference value based on the target message, send the second reference value to the first AN, so that the first AN sends the second reference value to the terminal.

In another optional solution, the second AN further includes a fifth sending unit, where the fifth sending unit is configured to, after the second AN obtains the second reference value based on the target message, send the second reference value to the terminal.

It should be noted that for embodiments of the units, refer to corresponding descriptions in the method embodiment shown in FIG. 3A.

According to the access network node 50 described in FIG. 5, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 6:
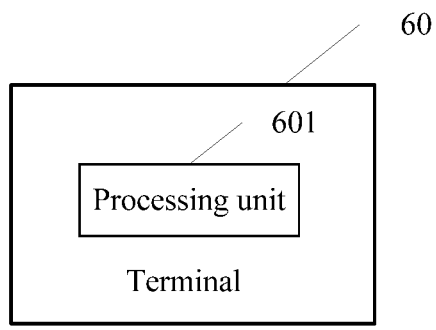
FIG. 6 is a schematic structural diagram of a terminal according to an embodiment of the present invention.

FIG. 6 is a schematic structural diagram of a terminal 60 according to an embodiment of the present invention. The terminal 60 includes a processing unit 601. The processing unit 601 is configured to, when the terminal meets a condition of being handed over from a first AN to a second AN, generate a second reference value, or receive the second reference value sent by the first AN, or receive the second reference value sent by the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number SN.

The foregoing unit is run, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In an optional solution, that the terminal generates a second reference value is specifically: receiving a parameter generation request sent by the first AN when the first AN determines that the terminal meets the condition of being handed over from the first AN to the second AN; and randomly generating the second reference value based on the parameter generation request by using a randomized algorithm, or deriving the second reference value based on the parameter generation request according to the preset rule.

It should be noted that for embodiments of the units, refer to corresponding descriptions in the method embodiment shown in FIG. 3A.

According to the terminal 60 described in FIG. 6, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 7:
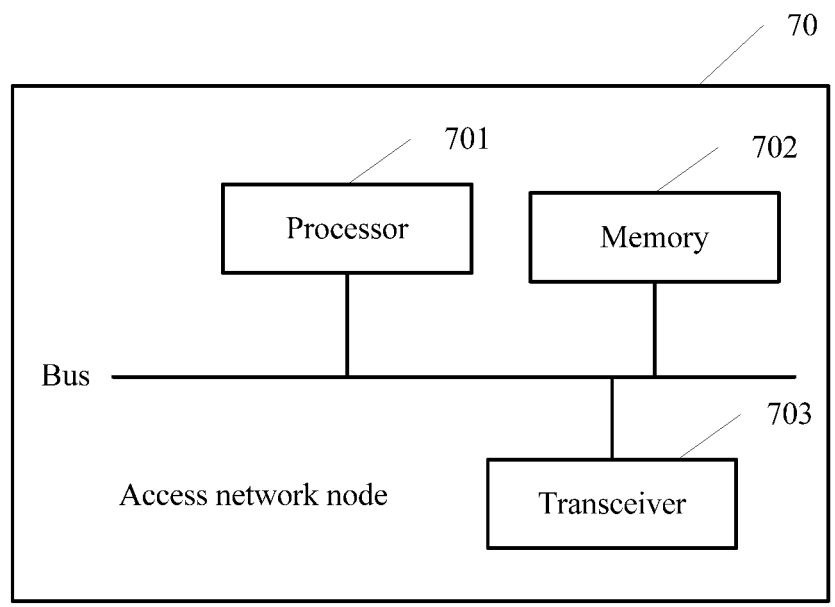
FIG. 7 is a schematic structural diagram of another access network node according to an embodiment of the present invention.

FIG. 7 shows an access network node 70 according to an embodiment of the present invention. The access network node 70 is a first AN. The first AN includes a processor 701, a memory 702, and a transceiver 703. The processor 701, the memory 702, and the transceiver 703 are connected to each other by using a bus.

The memory 702 includes but is not limited to a random access memory (RAM), a read-only memory (ROM), an erasable programmable read-only memory (EPROM), or a compact disc read-only memory (CD-ROM). The memory 702 is configured to store a related instruction and related data. The transceiver 703 is configured to receive and send data.

The processor 701 may be one or more central processing units (CPU). When the processor 701 is one CPU, the CPU may be a single-core CPU, or may be a multi-core CPU.

The processor 701 of the first AN is configured to read program code stored in the memory 702, to perform the following operations:

determining that a terminal accessing the first AN meets a condition of being handed over from the first AN to a second AN, where a value of a target parameter used for encryption and/or integrity protection when the terminal and the first AN communicate with each other before the terminal is handed over to the second AN is equal to a first reference value, and the target parameter is a counter or a sequence number SN; and sending a target message to the second AN by using the transceiver 703, to instruct the second AN to obtain a second reference value, where the second reference value is used as a value of the target parameter used for encryption and/or integrity protection when the second AN and the terminal communicate with each other.

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In an optional solution, before the processor 701 sends the target message to the second AN by using the transceiver 703, to instruct the second AN to obtain the second reference value, the processor 701 is further configured to send a target request to an MM by using the transceiver 703, to request the MM to generate the second reference value, and receive the second reference value that is generated by the MM based on the target request and that is sent by the MM, where the target message includes the second reference value.

In another optional solution, before the processor 701 sends the target message to the second AN by using the transceiver 703, to instruct the second AN to obtain the second reference value, the processor 701 is further configured to randomly generate the second reference value by using a randomized algorithm, or derive the second reference value according to a preset rule, where the target message includes the second reference value.

In another optional solution, the processor 701 is further configured to send the second reference value to the terminal by using the transceiver 703.

In another optional solution, the processor 701 is further configured to send a parameter generation request to the terminal by using the transceiver 703, so that the terminal randomly generates the second reference value based on the parameter generation request by using the randomized algorithm, or derives the second reference value based on the parameter generation request according to the preset rule.

It should be noted that for embodiments of the operations, refer to corresponding descriptions in the method embodiment shown in FIG. 3A.

According to the device 70 described in FIG. 7, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 8:
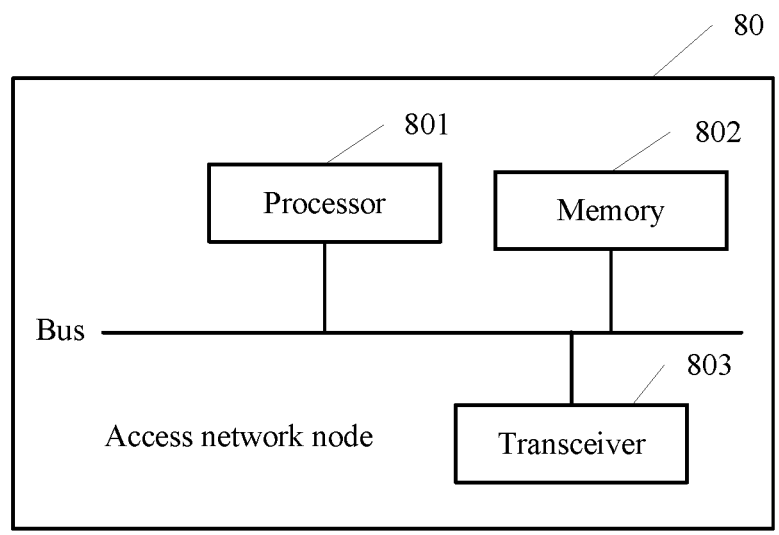
FIG. 8 is a schematic structural diagram of another access network node according to an embodiment of the present invention.

FIG. 8 shows an access network node 80 according to an embodiment of the present invention. The access network node 80 is a second AN. The second AN includes a processor

801, a memory 802, and a transceiver 803. The processor 801, the memory 802, and the transceiver 803 are connected to each other by using a bus.

The memory 802 includes but is not limited to a RAM, a ROM, an EPROM, or a CD-ROM. The memory 802 is configured to store a related instruction and related data. The transceiver 803 is configured to receive and send data.

The processor 801 may be one or more CPUs. When the processor 801 is one CPU, the CPU may be a single-core CPU, or may be a multi-core CPU.

The processor 801 of the second AN is configured to read program code stored in the memory 802, to perform the following operations:

receiving, by using the transceiver 803, a target message sent by a first AN, where the target message is a message sent by the first AN when the first AN determines that the terminal meets a condition of being handed over from the first AN to the second AN, a value of a target parameter used for encryption and/or integrity protection when the terminal and the first AN communicate with each other before the terminal is handed over to the second AN is equal to a first reference value, and the target parameter is a counter or a sequence number (SN); and obtaining a second reference value based on the target message, where the second reference value is used as a value of the target parameter used for encryption and/or integrity protection when the second AN and the terminal communicate with each other.

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In an optional solution, the target message includes the second reference value, and that the processor 801 obtains a second reference value based on the target message is specifically: parsing out the second reference value from the target message.

In another optional solution, that the processor 801 obtains a second reference value based on the target message is specifically: randomly generating the second reference value based on the target message by using a randomized algorithm, or deriving the second reference value based on the target message according to a preset rule.

In another optional solution, that the processor 801 obtains a second reference value based on the target message is specifically: sending a target request to an MM based on the target message by using the transceiver 803, to request the MM to generate the second reference value; and receiving, by using the transceiver 803, the second reference value sent by the MM.

In another optional solution, after the processor 801 is configured to obtain the second reference value based on the target message, the processor 801 is further configured to send the second reference value to the first AN by using the transceiver 803, so that the first AN sends the second reference value to the terminal.

In another optional solution, after the processor 801 is configured to obtain the second reference value based on the target message, the processor 801 is further configured to send the second reference value to the terminal by using the transceiver 803.

It should be noted that for embodiments of the operations, refer to corresponding descriptions in the method embodiment shown in FIG. 3A.

According to the access network node 80 described in FIG. 8, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 9:
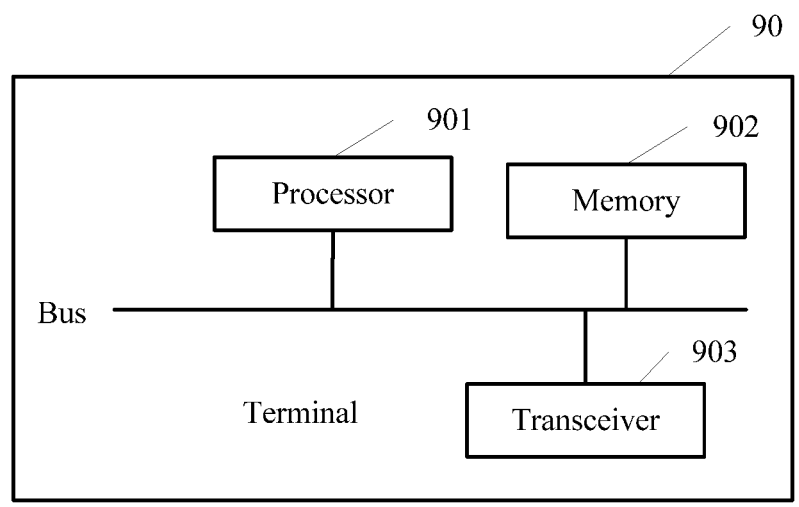
FIG. 9 is a schematic structural diagram of another terminal according to an embodiment of the present invention.

FIG. 9 shows a terminal 90 according to an embodiment of the present invention. The terminal 90 includes a processor 901, a memory 902, and a transceiver 903. The processor 901, the memory 902, and the transceiver 903 are connected to each other by using a bus.

The memory 902 includes but is not limited to a RAM, a ROM, an EPROM, or a CD-ROM. The memory 902 is configured to store a related instruction and related data. The transceiver 903 is configured to receive and send data.

The processor 901 may be one or more CPUs. When the processor 901 is one CPU, the CPU may be a single-core CPU, or may be a multi-core CPU.

The processor 901 of the terminal 90 is configured to read program code stored in the memory 902, to perform the following operations:

if the terminal meets a condition of being handed over from a first AN to a second AN, generating a second reference value, or receiving, by using the transceiver 903, the second reference value sent by the first AN, or receiving, by using the transceiver 903, the second reference value sent by the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number SN.

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In an optional solution, that the processor 901 generates a second reference value is specifically: receiving, by using the transceiver 903, a parameter generation request sent by the first AN when the first AN determines that the terminal meets the condition of being handed over from the first AN to the second AN; and randomly generating the second reference value based on the parameter generation request by using a randomized algorithm, or deriving the second reference value based on the parameter generation request according to the preset rule.

It should be noted that for embodiments of the operations, refer to corresponding descriptions in the method embodiment shown in FIG. 3A.

According to the terminal 90 described in FIG. 9, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 10:
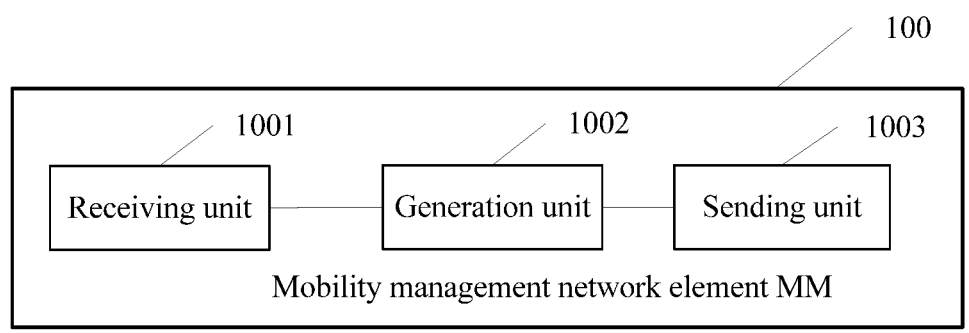
FIG. 10 is a schematic structural diagram of an MM according to an embodiment of the present invention.

FIG. 10 is a schematic structural diagram of a mobility management network element MM according to an embodiment of the present invention. The MM may include a receiving unit 1001, a generation unit 1002, and a sending unit 1003, and the units are described as follows:

The receiving unit 1001 is configured to receive a target message, where the target message is sent by a first access network node (AN) or a second access network node AN to the MM when a terminal meets a condition of being handed over from the first AN to the second AN. The generation unit 1002 is configured to generate a second reference value based on the target message. The sending unit 1003 is configured to send the second reference value to the second AN, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing steps are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In a possible embodiment, that the sending unit 1003 sends the second reference value to the second AN is specifically: sending the second reference value to the first AN, so that the first AN sends the second reference value to the second AN.

It should be noted that for embodiments of the units, refer to corresponding descriptions in the method embodiment shown in FIG. 3A.

According to the MM described in FIG. 10, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

Figure 11:
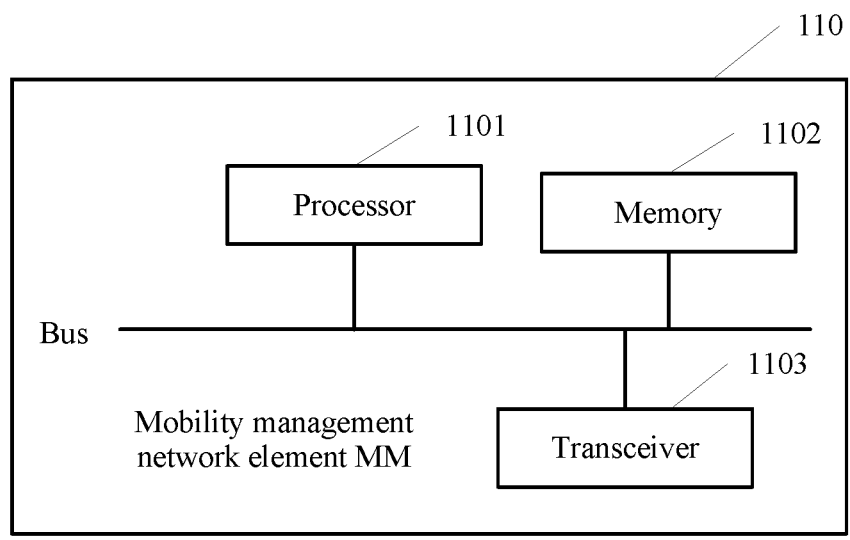
FIG. 11 is a schematic structural diagram of another MM according to an embodiment of the present invention.

FIG. 11 shows a mobility management network element MM 110 according to an embodiment of the present invention. The MM 110 includes a processor 1101, a memory 1102, and a transceiver 1103. The processor 1101, the memory 1102, and the transceiver 1103 are connected to each other by using a bus.

The memory 1102 includes but is not limited to a RAM, a ROM, an EPROM, or a CD-ROM. The memory 1102 is configured to store a related instruction and related data. The transceiver 1103 is configured to receive and send data.

The processor 1101 may be one or CPUs. When the processor 1101 is one CPU, the CPU may be a single-core CPU, or may be a multi-core CPU.

The processor 1101 of the MM is configured to read program code stored in the memory 1102, to perform the following operations:

receiving a target message by using the transceiver 1103, where the target message is sent by a first access network node (AN) or a second access network node (AN) to the MM when a terminal meets a condition of being handed over from the first AN to the second AN; generating a second reference value based on the target message; and sending the second reference value to the second AN by using the transceiver 1103, where the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, and the target parameter is a counter or a sequence number (SN).

The foregoing operations are performed, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

In a possible embodiment, that the processor 1101 sends the second reference value to the second AN by using the transceiver 1103 is specifically: sending the second reference value to the first AN by using the transceiver 1103, so that the first AN sends the second reference value to the second AN.

It should be noted that for embodiments of the operations, refer to corresponding descriptions in the method embodiment shown in FIG. 3A.

According to the MM described in FIG. 11, when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal. In conclusion, the embodiments of the present invention are implemented, so that when the terminal is handed over from the first AN to the second AN for communication, the terminal and the second AN both obtain the second reference value, and encryption and/or integrity protection are/is subsequently performed between the terminal and the second AN by using the second reference value instead of still using the first reference value. In this way, when an attacker intercepts the first reference value used before the terminal is handed over and the second reference value used after the terminal is handed over, because the first reference value is different from the second reference value, the attacker does not deduce that the first reference value and the second reference value come from a same terminal, thereby improving security performance of the terminal.

A person of ordinary skill in the art may understand that all or some of the procedures of the methods in the embodiments may be implemented by a computer program instructing related hardware. The program may be stored in a computer readable storage medium. When the program runs, the procedures of the methods in the embodiments are performed. The foregoing storage medium includes: any medium that can store program code, for example, a ROM, a random access memory RAM, a magnetic disk, or an optical disc.

What is claimed is:

1. A communications system, comprising:
  a first access network node (AN) configured to:
    determine that a terminal meets a condition of being handed over from the first AN to a second AN, wherein a value of a target parameter used for encryption and/or integrity protection when the terminal and the first AN communicate with each other before the terminal is handed over to the second AN is equal to a first reference value, and the target parameter is a counter or a sequence number (SN), and
    send a target message to the second AN, the target message instructing the second AN to obtain a second reference value;
  the second AN configured to obtain the second reference value based on the target message; and
  the terminal configured to obtain the second reference value, wherein the second reference value is used as a value of the target parameter used for encryption and/or integrity protection when the second AN and the terminal communicate with each other and the second reference value is randomly generated using a randomized algorithm or derived according to a preset rule.

2. The system according to claim 1, wherein the system further comprises a mobility management node (MM);
  the first AN is configured to send a target request to the MM to request the MM to generate the second reference value, and receive the second reference value sent by the MM, wherein the target message comprises the second reference value; and
  the MM is configured to receive the target request, generate the second reference value based on the target request, and send the generated second reference value to the first AN.

3. The system according to claim 1, wherein:
  the first AN is configured to randomly generate the second reference value using the randomized algorithm, or derive the second reference value according to the preset rule, wherein the target message comprises the second reference value; and
  wherein the second AN is configured to obtain the second reference value based on the target message further comprises: the second AN configured to parse out the second reference value from the target message.

4. The system according to claim 3, wherein:
  the first AN is configured to send the second reference value to the terminal; and
  wherein the terminal is configured to obtain the second reference value comprises: the terminal configured to receive the second reference value sent by the first AN.

5. The system according to claim 1, wherein the second AN is configured to obtain the second reference value based on the target message comprises:
  the second AN configured to randomly generate the second reference value based on the target message by using the randomized algorithm, or derive the second reference value based on the target message according to the preset rule.

6. The system according to claim 1, wherein the system comprises a mobility management node (MM);
  wherein the second AN is configured to obtain the second reference value based on the target message comprises: the second AN configured to send a target request to the MM based on the target message, request the MM to generate the second reference value, and receive the second reference value sent by the MM; and
  the MM is configured to receive the target request, generate the second reference value based on the target request, and send the generated second reference value to the second AN.

7. The system according to claim 6, wherein:
  the second AN is configured to send the second reference value to the first AN; and
  the first AN is configured to send the second reference value to the terminal.

8. The system according to claim 6, wherein:
the second AN is configured to send the second reference value to the terminal.

9. The system according to claim 6, wherein:
the first AN is configured to send a parameter generation request to the terminal; and
wherein the terminal is configured to obtain the second reference value comprises: the terminal configured to randomly generate the second reference value based on the parameter generation request by using the randomized algorithm, or derive the second reference value based on the parameter generation request according to the preset rule.

10. A terminal, comprising:
a transceiver;
a memory configured to store a program; and
a processor, coupled with the transceiver and the memory, the processor configured to execute the program in the memory to perform operations comprising:
when the terminal meets a condition of being handed over from a first access network node (AN) to a second AN, obtaining a second reference value, wherein the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, the target parameter is a counter or a sequence number (SN), and the second reference value is randomly generated using a randomized algorithm or derived according to a preset rule.

11. The terminal according to claim 10, wherein the processor executes the program to perform operations to obtain the second reference value comprising:
generating, by the processor, the second reference value.

12. The terminal according to claim 11, wherein the processor executes the program to perform operations to generate the second reference value comprising:
receiving, by the transceiver, a parameter generation request sent by the first AN when the first AN determines that the terminal meets the condition of being handed over from the first AN to the second AN; and
randomly generating the second reference value based on the parameter generation request using the randomized algorithm, or deriving the second reference value based on the parameter generation request according to the preset rule.

13. The terminal according to claim 10, wherein the processor executes the program to perform operations to obtain the second reference value comprising:
receiving, by the transceiver, the second reference value sent by the first AN.

14. The terminal according to claim 10, wherein the processor executes the program to perform operations to obtain the second reference value comprising:
receiving, by the transceiver, the second reference value sent by the second AN.

15. A communication method, comprising:
when a terminal meets a condition of being handed over from a first access network node (AN) to a second AN, obtaining, by the terminal, a second reference value, wherein the second reference value is used as a value of a target parameter used for encryption and/or integrity protection when the second AN and the terminal communicate with each other, a value of the target parameter used for encryption and/or integrity protection when the terminal and the first AN communicate with each other before the terminal is handed over to the second AN is equal to a first reference value, the target parameter is a counter or a sequence number (SN) and the second reference value is randomly generated using a randomized algorithm or derived according to a preset rule.

16. The method according to claim 15, wherein the obtaining, by the terminal, the second reference value, further comprises:
generating, by the terminal, the second reference value.

17. The method according to claim 16, wherein the generating, by the terminal, the second reference value comprises:
receiving a parameter generation request sent by the first AN when the first AN determines that the terminal meets the condition of being handed over from the first AN to the second AN; and
randomly generating the second reference value based on the parameter generation request by using the randomized algorithm, or deriving the second reference value based on the parameter generation request according to the preset rule.

18. The method according to claim 15, wherein the obtaining, by the terminal, the second reference value, further comprises:
receiving, by the terminal, the second reference value sent by the first AN.

19. The method according to claim 15, wherein the obtaining, by the terminal, the second reference value, further comprises:
receiving, by the terminal, the second reference value sent by the second AN.

* * * * *